(12) United States Patent
Keating et al.

(10) Patent No.: US 11,824,784 B2
(45) Date of Patent: Nov. 21, 2023

(54) AUTOMATED PLATFORM RESOURCE MANAGEMENT IN EDGE COMPUTING ENVIRONMENTS

(71) Applicant: Intel Corporation, Santa Clara, CA (US)

(72) Inventors: Brian Andrew Keating, Limerick (IE); Marcin Spoczynski, Leixlip (IE); Lokpraveen Mosur, Gilbert, AZ (US); Kshitij Arun Doshi, Tempe, AZ (US); Francesc Guim Bernat, Barcelona (ES)

(73) Assignee: Intel Corporation, Santa Clara, CA (US)

( * ) Notice: Subject to any disclaimer, the term of this patent is extended or adjusted under 35 U.S.C. 154(b) by 141 days.

(21) Appl. No.: 16/723,330

(22) Filed: Dec. 20, 2019

(65) Prior Publication Data
US 2020/0145337 A1    May 7, 2020

(51) Int. Cl.
*G06F 9/50* (2006.01)
*H04L 41/16* (2022.01)
(Continued)

(52) U.S. Cl.
CPC ........ *H04L 47/2425* (2013.01); *G06F 9/5011* (2013.01); *G06F 9/5077* (2013.01);
(Continued)

(58) Field of Classification Search
CPC ... H04L 47/2425; H04L 49/70; H04L 47/805; H04L 47/781; H04L 41/5009;
(Continued)

(56) References Cited

U.S. PATENT DOCUMENTS 9,805,345 B1 * 10/2017 Dailianas ............ G06F 9/45558
10,990,850 B1 *  4/2021 Chen ..................... G06N 20/00
(Continued)

FOREIGN PATENT DOCUMENTS

| CN | 101753449 | 2/2012 |
|----|-----------|--------|
| CN | 103118124 | 8/2015 |

OTHER PUBLICATIONS

Merkt, Roland, "IBM ECM System Monitor", IBM, (2014), 64 pgs.

*Primary Examiner* — Abu Zar Ghaffari
(74) *Attorney, Agent, or Firm* — Schwegman Lundberg & Woessner, P.A.

(57) ABSTRACT

Various approaches for implementing platform resource management are described. In an edge computing system deployment, an edge computing device includes processing circuitry coupled to a memory. The processing circuitry is configured to obtain, from an orchestration provider, an SLO (or SLA) that defines usage of an accessible feature of the edge computing device by a container executing on a virtual machine within the edge computing system. A computation model is retrieved based on at least one key performance indicator (KPI) specified in the SLO. The defined usage of the accessible feature is mapped to a plurality of feature controls using the retrieved computation model. The plurality of feature controls is associated with platform resources of the edge computing device that are pre-allocated to the container. The usage of the platform resources allocated to the container is monitored using the plurality of feature controls.

25 Claims, 19 Drawing Sheets

(51) Int. Cl.
*H04L 41/5009* (2022.01)
*H04L 47/2425* (2022.01)
*H04L 49/00* (2022.01)
*H04L 47/80* (2022.01)
*H04L 47/78* (2022.01)
*H04L 41/06* (2022.01)
*H04L 41/40* (2022.01)
*H04L 41/5025* (2022.01)
*H04L 41/5054* (2022.01)

(52) U.S. Cl.
CPC .............. *H04L 41/06* (2013.01); *H04L 41/40* (2022.05); *H04L 41/5009* (2013.01); *H04L 41/5025* (2013.01); *H04L 47/781* (2013.01); *H04L 47/805* (2013.01); *H04L 49/70* (2013.01); *G06F 2209/501* (2013.01); *G06F 2209/503* (2013.01); *G06F 2209/508* (2013.01); *H04L 41/5054* (2013.01)

(58) Field of Classification Search
CPC . H04L 41/16; H04L 41/5025; H04L 41/5054; G06F 9/5011; G06F 9/5077; G06F 2209/503; G06F 2209/508; G06F 2209/501
See application file for complete search history.

(56) References Cited

U.S. PATENT DOCUMENTS

| | | | |
|---|---|---|---|
| 2002/0152305 A1* | 10/2002 | Jackson | H04L 43/00 709/224 |
| 2009/0122706 A1 | 5/2009 | Alfano et al. | |
| 2014/0195673 A1* | 7/2014 | Cook | G06F 9/50 709/224 |
| 2015/0245160 A1* | 8/2015 | Agrawal | H04L 41/145 455/406 |
| 2017/0126432 A1* | 5/2017 | Padala | H04L 43/08 |
| 2017/0261949 A1* | 9/2017 | Hoffmann | G06N 7/005 |
| 2018/0285166 A1* | 10/2018 | Roy | G06F 9/5016 |
| 2018/0287902 A1* | 10/2018 | Chitalia | H04L 43/045 |
| 2019/0129745 A1* | 5/2019 | Wang | G06F 9/45558 |
| 2019/0132197 A1* | 5/2019 | Saxena | H04L 41/0803 |
| 2019/0156247 A1* | 5/2019 | Faulhaber, Jr. | G06N 20/00 |
| 2019/0312800 A1* | 10/2019 | Schibler | H04L 41/0823 |
| 2019/0370686 A1* | 12/2019 | Pezzillo | G06N 5/048 |
| 2020/0073717 A1* | 3/2020 | Hari | G06F 9/5061 |
| 2020/0104184 A1* | 4/2020 | Subramanian | G06N 3/08 |
| 2020/0327371 A1* | 10/2020 | Sharma | G06N 5/04 |
| 2021/0124617 A1* | 4/2021 | Choi | G06F 9/5072 |
| 2021/0181739 A1* | 6/2021 | Chen | G06F 9/5027 |
| 2022/0058056 A1* | 2/2022 | Opsenica | G06N 3/006 |

* cited by examiner

AUTOMATED PLATFORM RESOURCE MANAGEMENT IN EDGE COMPUTING ENVIRONMENTS

TECHNICAL FIELD

Embodiments described herein generally relate to data processing, network communication, and communication system implementations, and in particular, to techniques for automatically identifying resources and optimizing workload key performance indicators (KPIs) based on automated platform resource management in edge computing and Internet of Things (IoT) device networks.

BACKGROUND

Edge computing, at a general level, refers to the transition of compute and storage resources closer to endpoint devices (e.g., consumer computing devices, user equipment, etc.) in order to optimize total cost of ownership, reduce application latency, improve service capabilities, and improve compliance with security or data privacy requirements. Edge computing may, in some scenarios, provide a cloud-like distributed service that offers orchestration and management for applications among many types of storage and compute resources. As a result, some implementations of edge computing have been referred to as the "edge cloud" or the "fog", as powerful computing resources previously available only in large remote data centers are moved closer to endpoints and made available for use by consumers at the "edge" of the network.

Edge computing use cases in mobile network settings have been developed for integration with multi-access edge computing (MFC) approaches, also known as "mobile edge computing." MEC approaches are designed to allow application developers and content providers to access computing capabilities and an information technology (IT) service environment in dynamic mobile network settings at the edge of the network. Limited standards have been developed by the European Telecommunications Standards Institute (ETSI) industry specification group (ISG) in an attempt to define common interfaces for the operation of MEC systems, platforms, hosts, services, and applications.

Edge computing, MEC, and related technologies attempt to provide reduced latency, increased responsiveness, and more available computing power than offered in traditional cloud network services and wide area network connections. However, the integration of mobility and dynamically launched services to some mobile use and device processing use cases has led to limitations and concerns with orchestration, functional coordination, and resource management, especially in complex mobility settings where many participants (devices, hosts, tenants, service providers, operators) are involved.

In a similar manner, Internet of Things (IoT) networks and devices are designed to offer a distributed compute arrangement, from a variety of endpoints. IoT devices are physical or virtualized objects that may communicate on a network and may include sensors, actuators, and other input/output components, which may be used to collect data or perform actions in a real-world environment. For example, IoT devices may include low-powered endpoint devices that are embedded or attached to everyday things, such as buildings, vehicles, packages, etc., to provide an additional level of artificial sensory perception of those things. Recently, IoT devices have become more popular and thus applications using these devices have proliferated.

The deployment of various Edge, Fog, MEC, private enterprise networks (e.g., software-defined wide area networks, or SD-WANs), and IoT networks, devices, and services have introduced a number of advanced use cases and scenarios occurring at and towards the edge of the network. However, these advanced use cases have also introduced a number of corresponding technical challenges relating to security, processing, and network resources, service availability, and efficiency, among many other issues. One such challenge is in relation to the management of platform resources, such as network resources available to an edge computing device within a communication network (including hardware/software resources of the edge computing device as well as resources of other network nodes available for use by the edge computing device). More specifically, monitoring and controlling resources on edge platforms can be complex, and in many cases cannot be done at sufficiently fine granularity due to the limitation of resources available on edge platforms. As a result, it may be difficult for applications to meet stringent service level agreements/objectives (SLAs/SLOs) that modern applications may need.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
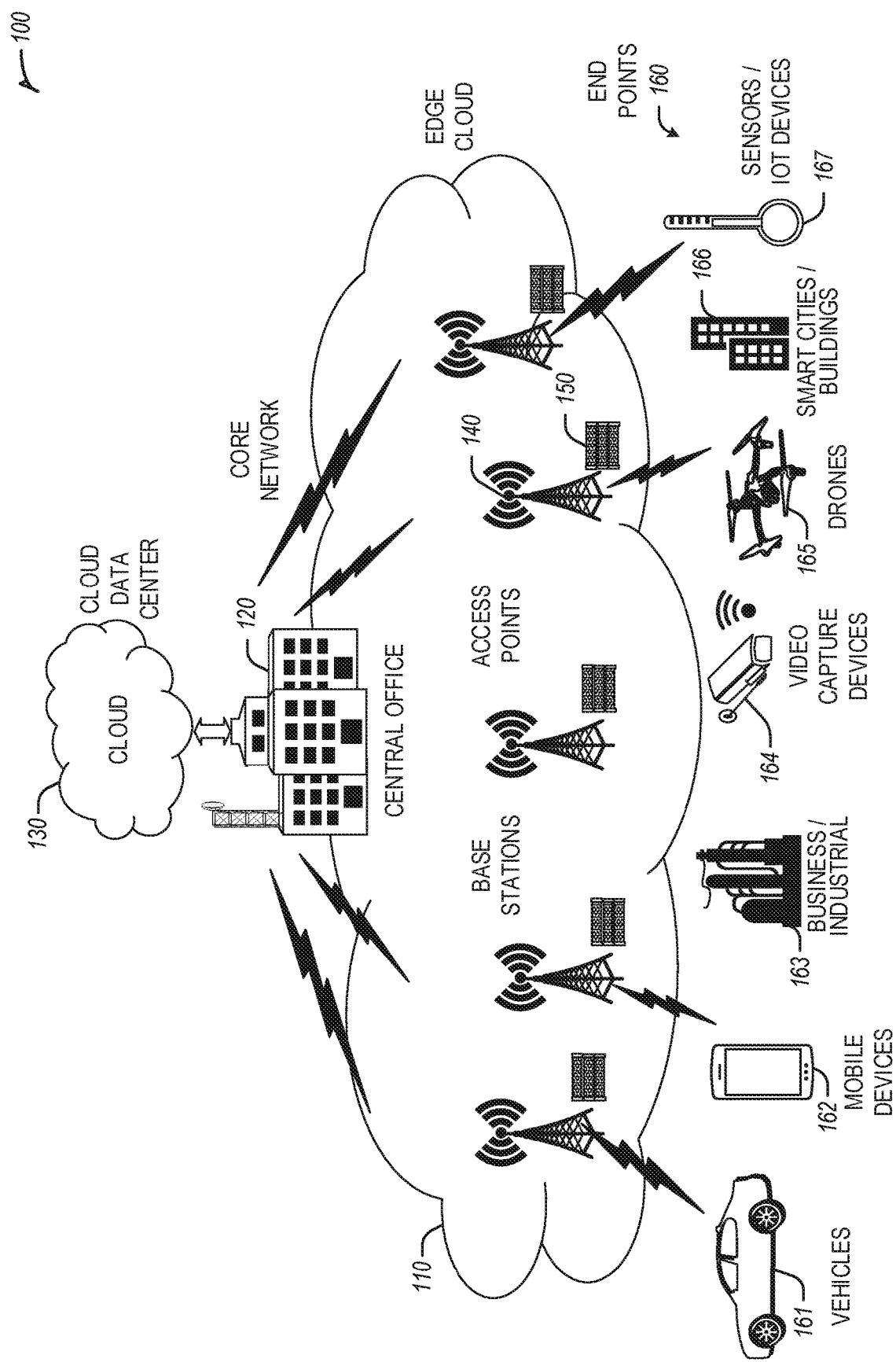
FIG. 1 illustrates an overview of an edge cloud configuration for edge computing, according to an example.

In the following description, methods, configurations, and related apparatuses are disclosed for automated platform resource management in edge computing environments. The following examples introduce specific configurations and usage of a platform resource manager (PRM) in a networked device setting. These examples enable platform management flexibility with increased number of exposed low-level controls, including bandwidth of various buses (e.g. memory, PCIe, UPI), the utilization of various accelerators, counters, and metrics accessible via a performance monitoring unit (PMU) or model-specific registers (MSRs), as well as other registers, low-level interfaces, and recipes, to control different aspects of the edge platform resource utilization. In this regard, a PRM may be configured to configure, monitor, and control edge platform resources at the granularity of, e.g., individual edge services or containers, of which there can be up to the order of a thousand in a single edge platform. As used herein, the term "platform resources" or "edge platform resources" includes network resources available to an edge computing device within a communication network such as an edge networks. In this regard, platform resources may include hardware/software resources of the edge computing device itself as well as resources of other network nodes available for use by the edge computing device.

Applicability of Platform Resource Management Techniques

The present platform resource management techniques may be coordinated and monitored in a variety of device and computing system deployment environments involving the edge computing/edge cloud deployments, cloud deployments, Internet of Things (IoT) networks, Multi-Access Edge Computing (MEC) systems, edge workloads such as network function virtualization (NFV) implementations or other virtualized node functions, and other aspects of networking technologies.

For example, resource management techniques discussed herein relate to usage of PRMs in edge platforms, may allow developers to express service level objectives/requirements in terms of Key Performance Indicators (KPIs) in SLAs (or SLOs) that are meaningful to the developer/user, such as response time, jitter/determinism, latency, etc. This is increasingly important in network architectures in which software development is migrating from coarse-grained monolithic applications into a set of fine-grained microservices deployed as containers in, e.g., function-as-a-service (FaaS) or other types of network environments. In an example embodiment, a set of KPIs may be specified in an industry-standard way, in conjunction with communication service provider (CSP) requirements. As used herein, the term "SLA" refers to SLAs provided within a single platform. A separate layer may be used that spans multiple platforms in order to use end-to-end SLAs in connection with disclosed techniques.

To differentiate between SLAs and SLOs, SLOs include application metrics (e.g., frames-per-second, or fps), and SLAs are the resources that are needed to be granted to perform or achieve an SLO (e.g., 10 GBs of memory to obtain 40 fps). An SLA may be considered a representation of interactions between a user/client and a network orchestrator entity, while an SLO may be considered the result of interactions between the network orchestrator entity and a PRM. In this regard, the network orchestrator entity may convert/translate SLAs into SLOs, prior to communicating the SLOs to the PRM for processing. In some aspects, the SLAs and the SLOs may be communicated to the PRM for processing.

For example, in a MEC-based edge computing environment, MFC workflows associated with one or more MFC services involve communication via sideband interface with a workload origination node as well as an orchestration node (or other master or trusted nodes). The need to control such sideband interface may inhibit the free flow of performance or utilization information to the control planes of these services. Meanwhile, the need to enforce supervision by privileged entities over multiplexing of platform resources inhibits just-in-time or agile reassignment of edge platform resources from those tasks/services/functions that have less urgent needs than those whose needs are (or will become) more critical. One of the present examples includes using a PRM to configure platform resource monitoring and management at a sufficiently fine granularity level using low-level controls, allowing for flexible monitoring and reassignment of edge platform resources.

A brief comparison with conventional approaches, existing resource managers expose only basic platform telemetry, such as CPU utilization or network utilization. Additionally, these conventional approaches lack the ability to utilize service level objectives (SLOs) (corresponding to SLAs) that specify KPIs with lower granularity, such as at the level of a container or an edge service. However, platform resource management techniques discussed herein configure a PRM with multiple interfaces, allowing the PRM to receive and interpret/translate SLOs specifying KPIs with lower granularity, as well as to set low-level, fine-grained platform resource controls allowing platform resource allocation and monitoring to ensure compliance with the SLOs/SLAs. In some examples, the disclosed platform resource management techniques further allow for dynamic monitoring and adjustment of platform resource availability, and corresponding adjustments in translating the SLOs into the low level, fine-grained platform resource controls. In some examples, the interpretation/translation of SLOs into low-level, fine-grained platform resource controls is achieved using machine learning techniques, such as computation models trained in connection with a deep learning training architecture (DLTA) to perform the SLO translation tasks.

The present platform resource management techniques and configurations may be utilized in connection with many aspects of current networking systems, but are provided with reference to Edge Cloud, IoT, Multi-access Edge Computing (MEC), and other distributed computing deployments. The following systems and techniques may be implemented in, or augment, a variety of distributed; virtualized, or managed edge computing systems. These include environments in which network services are implemented or managed using multi-access edge computing (MEC) or 4G/5G wireless network configurations; or in wired network configurations involving fiber, copper, and other connections. Further, aspects of processing by the respective computing components may involve computational elements that are in the geographical proximity of user equipment or other endpoint locations, such as a smartphone, vehicular communication component, IoT device, etc. Further, the presently disclosed techniques may relate to other Edge/MEC/IoT network communication standards and configurations, and other intermediate processing entities and architectures.

Example Edge Computing Architectures

FIG. 1 is a block diagram 100 showing an overview of a configuration for edge computing, which includes a layer of processing referenced in many of the current examples as an "edge cloud". This network topology, which may include a number of conventional networking layers (including those not shown herein), may be extended through the use of the resource management and network configurations discussed herein.

As shown, the edge cloud 110 is co-located at an edge location, such as the base station 140, a local processing hub 150, or a central office 120, and thus may include multiple entities, devices, and equipment instances. The edge cloud 110 is located much closer to the endpoint (consumer and producer) data sources 160 (e.g., autonomous vehicles 161, user equipment 162, business and industrial equipment 163, video capture devices 164, drones 165, smart cities and building devices 166, sensors and IoT devices 167, etc.) than the cloud data center 130. Compute, memory, and storage resources which are offered at the edges in the edge cloud 110 are critical to providing ultra-low latency response times for services and functions used by the endpoint data sources 160 as well as reduce network backhaul traffic from the edge cloud 110 toward cloud data center 130 thus improving energy consumption and overall network usages among other benefits.

Compute, memory, and storage are scarce resources, and generally, decrease depending on the edge location (e.g., fewer processing resources being available at consumer end point devices than at a base station or at a central office). However, the closer that the edge location is to the endpoint (e.g., UEs), the more that space and power are constrained. Thus, edge computing, as a general design principle, attempts to minimize the number of resources needed for network services, through the distribution of more resources which are located closer both geographically and in-network access time.

The following describes aspects of an edge cloud architecture that covers multiple potential deployments and addresses restrictions that some network operators or service providers may have in their own infrastructures. These include variation of configurations based on the edge location (because edges at a base station level, for instance, may have more constrained performance); configurations based on the type of compute, memory, storage, fabric, acceleration, or like resources available to edge locations, tiers of locations, or groups of locations; the service, security, and management and orchestration capabilities; and related objectives to achieve usability and performance of end services.

Edge computing is a developing paradigm where computing is performed at or closer to the "edge" of a network, typically through the use of a compute platform implemented at base stations, gateways, network routers, or other devices which are much closer to end point devices producing and consuming the data. For example, edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for the connected user equipment, without further communicating data via backhaul networks. Or as another example, central office network management hardware may be replaced with compute hardware that performs virtualized network functions and offers compute resources for the execution of services and consumer functions for connected devices. These and other scenarios may involve the use of platform resource management, as provided in the discussion below.

In contrast to the network architecture of FIG. 1, traditional endpoint (e.g., UE, vehicle-to-vehicle (V2V), vehicle-to-everything (V2X), etc.) applications are reliant on local device or remote cloud data storage and processing to exchange and coordinate information. A cloud data arrangement allows for long-term data collection and storage, but is not optimal for highly time-varying data, such as a collision, traffic light change, etc. and may fail in attempting to meet latency challenges.

Depending on the real-time requirements in a communications context, a hierarchical structure of data processing and storage nodes may be defined in an edge computing deployment. For example, such a deployment may include local ultra-low-latency processing, regional storage, and processing as well as remote cloud data-center based storage and processing. Key performance indicators (KPIs) may be used to identify where sensor data is best transferred and where it is processed or stored. This typically depends on the ISO layer dependency of the data. For example, a lower layer (PHY, MAC, routing, etc.) data typically changes quickly and is better handled locally in order to meet latency requirements. Higher layer data such as Application-Layer data is typically less time-critical and may be stored and processed in a remote cloud data-center.

Figure 2:
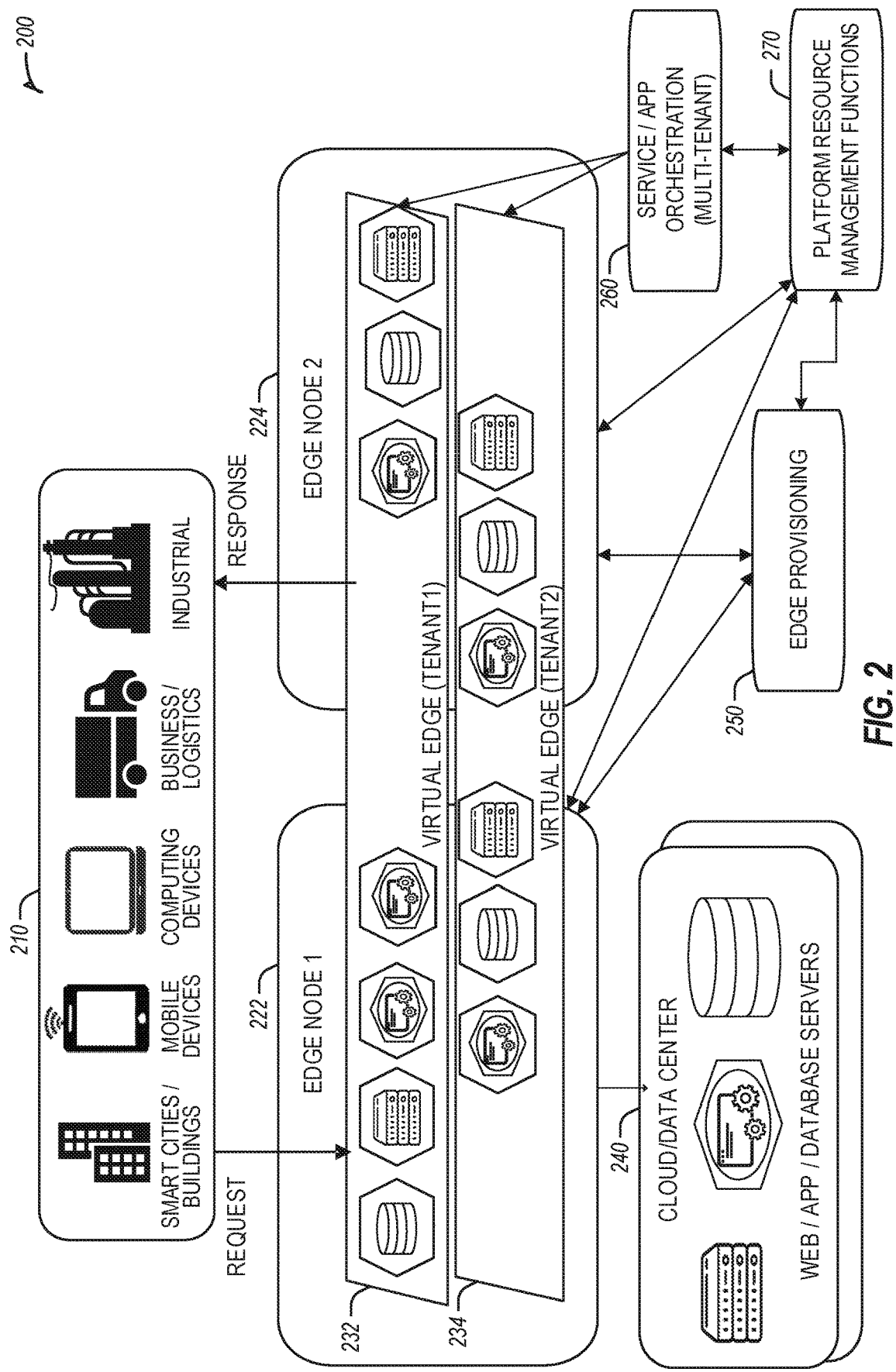
FIG. 2 illustrates deployment and orchestration for virtual edge configurations across an edge-computing system operated among multiple edge nodes and multiple tenants, according to an example.

FIG. 2 illustrates deployment and orchestration for virtual edge configurations across an edge-computing system operated among multiple edge nodes and multiple tenants. Specifically, FIG. 2 depicts coordination of a first edge node 222 and a second edge node 224 in an edge-computing system 200, to fulfill requests and responses for various client endpoints 210 from various virtual edge instances. The virtual edge instances provide edge compute capabilities and processing in an edge cloud, with access to a cloud/data, center 240 for higher-latency requests for websites, applications, database servers, etc. Thus, the edge cloud enables coordination of processing among multiple edge nodes for multiple tenants or entities.

In the example of FIG. 2, these virtual edge instances include a first virtual edge 232, offered to a first tenant (Tenant 1), which offers a first combination of edge storage, computing, and services; and a second virtual edge 234, offering a second combination of edge storage, computing, and services, to a second tenant (Tenant 2). The virtual edge instances 232, 234 are distributed among the edge nodes 222, 224, and may include scenarios in which a request and response are fulfilled from the same or different edge nodes. The configuration of each edge node 222, 224 to operate in a distributed yet coordinated fashion occurs based on edge provisioning functions 250 and platform resource management functions 270. The functionality of the edge nodes 222, 224 to provide coordinated operation for applications and services, among multiple tenants, occurs based on orchestration functions 260.

Platform resource management functions 270 can be used to configure at least one PRM (e.g., discussed in connection with FIG. 8-FIG. 15) to manage resource utilization of edge nodes 222 and 224 in connection with one or more SLAB. In this regard, one or more of the platform resource management functions 270 may be performed by a PRM (e.g., PRM 802 in FIG. 8).

It should be understood that some of the devices in 210 are multi-tenant devices where Tenant1 may function within a Tenant1 'slice' while a Tenant2 may function within a Tenant2 slice. A trusted multi-tenant device may further contain a tenant-specific cryptographic key such that the combination of key and slice may be considered a "root of trust" (RoT) or tenant-specific RoT. An RoT may further be computed dynamically composed using a security architecture, such as a DICE (Device identity Composition Engine) architecture where a DICE hardware building block is used to construct layered trusted computing base contexts for layering of device capabilities (such as a Field Programmable Gate Array (FPGA)). The RoT also may be used for a trusted computing context to support respective tenant operations, etc. The use of this and the security architecture may be enhanced by the attestation operations further discussed herein.

The platform resource management functions 270 may partition resources (memory, CPU, GPU, interrupt controller, I/O controller, memory controller, bus controller, etc.), where each partition may contain an RoT capability and where fan-out and layering according to a DICE model may further be applied to edge nodes. Cloud computing nodes consisting of containers, FaaS (function as a service) engines, servlets, servers, or other computation abstraction may be partitioned according to a DICE layering and fan-out structure to support an RoT context for each. Accordingly, the respective RoTs spanning entities 210, 222, and 240 may coordinate the establishment of a distributed trusted computing base (DTCB) such that a tenant-specific virtual trusted secure channel linking all elements end-to-end can be established.

Additionally, the edge computing system may be extended to provide orchestration of multiple applications through the use of containers (a contained, deployable unit of software that provides code and needed dependencies), in a multi-owner, multi-tenant environment. A multi-tenant orchestrator may be used to perform key management, trust anchor management, and other security functions related to the provisioning and lifecycle of the trusted 'slice' concept in FIG. 2. An orchestrator may use a DICE layering and fan-out construction to create a root of trust context that is tenant-specific. Thus, orchestration functions, provided by an orchestrator, may participate as a tenant-specific orchestration provider.

Accordingly, an edge-computing system may be configured to fulfill requests and responses for various client endpoints from multiple virtual edge instances (and, from a cloud or remote data center, not shown). The use of these virtual edge instances supports multiple tenants and multiple applications (e.g., AR/VR, enterprise applications, content delivery, gaming, compute offload) simultaneously. Further, there may be multiple types of applications within the virtual edge instances (e.g., normal applications, latency-sensitive applications, latency-critical applications, user plane applications, networking applications, etc.). The virtual edge instances may also be spanned across systems of multiple owners at different geographic locations.

In further examples, edge computing systems may deploy containers in an edge computing system. As a simplified example, a container manager is adapted to launch containerized pods, functions, and functions-as-a-service instances through execution via compute nodes, or to separately execute containerized virtualized network functions through execution via compute nodes. In this regard, a container can be used for executing an application associated with a service or other virtualized node functions. An edge service instance can include multiple containers, where each container may be associated with its own SLA. A container arrangement (e.g., an edge service instance) may be adapted for use by multiple tenants in system arrangement, where containerized pods, functions, and functions-as-a-service instances are launched within virtual machines specific to each tenant (aside from the execution of virtualized network functions).

Within the edge cloud, a first edge node 222 (e.g., operated by a first owner) and a second edge node 224 (e.g., operated by a second owner) may operate or respond to a container orchestrator as well as to a PRM to coordinate the execution of various applications within the virtual edge instances offered for respective tenants as well as management of platform resources in connection with execution of the various applications. For instance, the edge nodes 222, 224 may be coordinated based on edge provisioning functions 250 and platform resource management functions 270, while the operation of the various applications are coordinated with orchestration functions 260.

Various system arrangements may provide an architecture that treats VMs, Containers, and Functions equally in terms of application composition (and resulting applications are combinations of these three ingredients). Each ingredient may involve the use of one or more accelerators (e.g., FPGA, ASIC) components as a local backend. In this manner, applications can be split across multiple edge owners, coordinated by an orchestrator.

Figure 3:
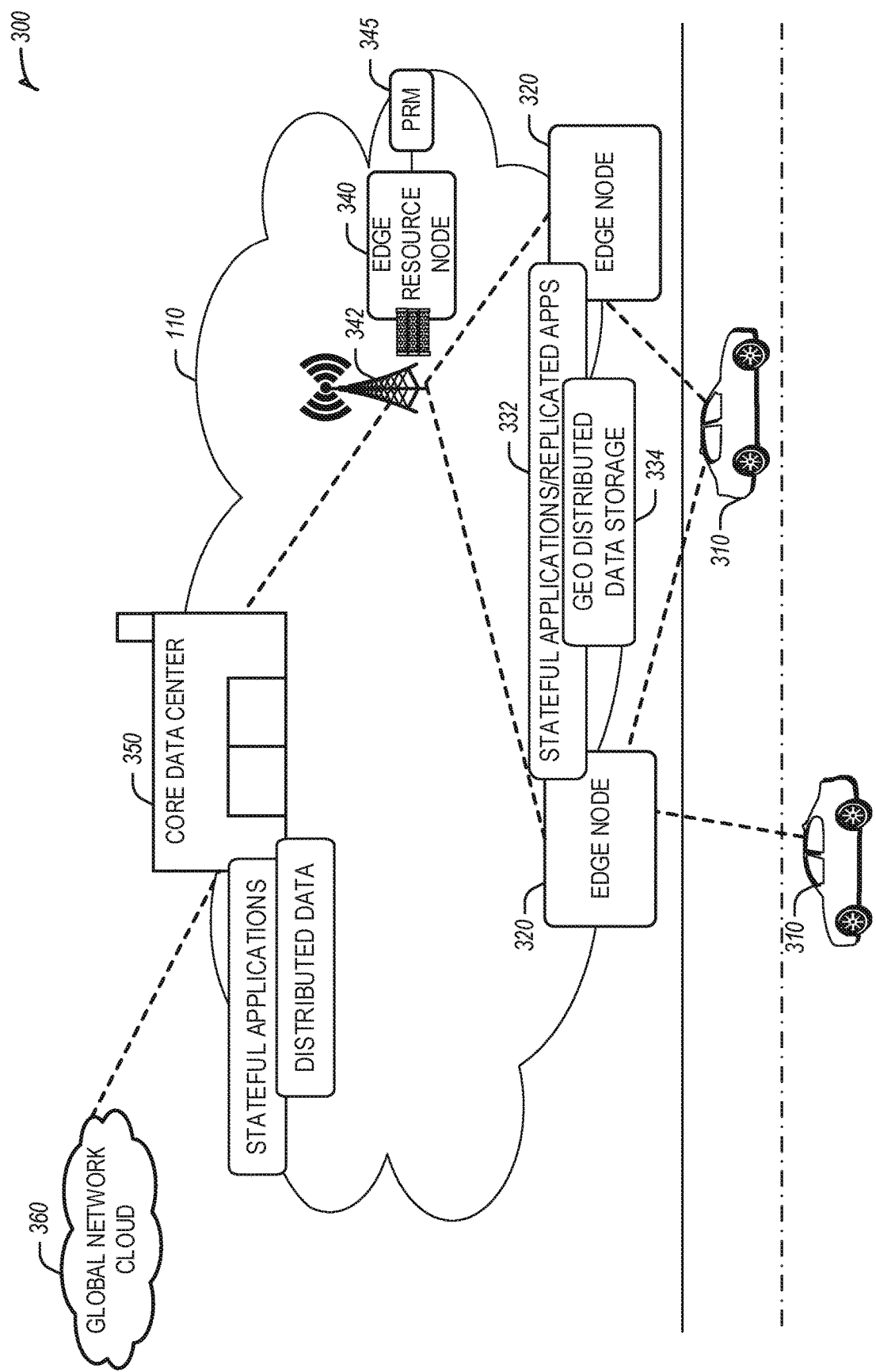
FIG. 3 illustrates a vehicle compute and communication use case involving mobile access to applications in an edge-computing system, according to an example.

It should be appreciated that the edge computing systems and arrangements discussed herein may be applicable in various solutions, services, and/or use cases. As an example, FIG. 3 shows a simplified vehicle compute and communication use case involving mobile access to applications in an edge computing system 300 that implements an edge cloud 110 and a PRM 345 (which can be the same as PRM 802 in FIG. 8). In this use case, each client compute node 310 may be embodied as in-vehicle compute systems (e.g., in-vehicle navigation and/or infotainment systems) located in corresponding vehicles that communicate with the edge gateway nodes 320 during traversal of a roadway. For instance, edge gateway nodes 320 may be located in roadside cabinets, which may be placed along the roadway, at intersections of the roadway, or other locations near the roadway. As each vehicle traverses along the roadway, the connection between its client compute node 310 and a particular edge gateway node 320 may propagate so as to maintain a consistent connection and context for the client compute node 310. Each of the edge gateway nodes 320 includes some processing and storage capabilities and, as such, some processing and/or storage of data for the client compute nodes 310 may be performed on one or more of the edge gateway nodes 320.

Each of the edge gateway nodes 320 may communicate with one or more edge resource nodes 340, which are illustratively embodied as compute servers, appliances or components located at or in a communication base station 342 (e.g., a base station of a cellular network). As discussed above, each edge resource node 340 includes some processing and storage capabilities and, as such, some processing and/or storage of data for the client compute nodes 310 may be performed on the edge resource node 340. For example, the processing of data that is less urgent or important may be performed by the edge resource node 340, while the processing of data that is of a higher urgency or importance may be performed by edge gateway devices or the client nodes themselves (depending on, for example, the capabilities of each component). Further, various wired or wireless communication links (e.g., fiber optic wired backhaul, 5G wireless links) may exist among the edge nodes 320, edge resource node(s) 340, core data center 350, and network cloud 360.

The edge resource nodes 340 may further include a PRM 345 configured to perform platform resource management functions discussed herein. For example, the PRM 345 can be configured to set low-level controls for monitoring resources of the edge nodes 320 in connection with one or more SLAs, as well as to adjust platform resource usage by the edge nodes 320 based on demands of the client compute nodes 310.

The edge resource node(s) 340 also communicate with the core data center 350, which may include compute servers, appliances, and/or other components located in a central location (e.g., a central office of a cellular communication network). The core data center 350 may provide a gateway to the global network cloud 360 (e.g., the Internet) for the edge cloud 110 operations formed by the edge resource node(s) 340 and the edge gateway nodes 320. Additionally, in some examples, the core data center 350 may include an amount of processing and storage capabilities and, as such, some processing and/or storage of data for the client compute devices may be performed on the core data center 350 (e.g., processing of low priority). The edge gateway nodes 320 or the edge resource nodes 340 may offer the use of stateful applications 332 and a geographically distributed data storage 334 (e.g., database, data store, etc.).

In further examples, FIG. 3 may utilize various types of mobile edge nodes, such as an edge node hosted in a vehicle (e.g., car, truck, tram, train, etc.) or other mobile units, as the edge node will move to other geographic locations along the platform hosting it. With vehicle-to-vehicle communications, individual vehicles may even act as network edge nodes for other cars, (e.g., to perform caching, reporting, data aggregation, etc.). Thus, it will be understood that the application components provided in various edge nodes may be distributed in a variety of settings, including coordination between some functions or operations at individual endpoint devices or the edge gateway nodes 320, some others at the edge resource node 340, and others in the core data center 350 or the global network cloud 360.

In further configurations, the edge computing system may implement FaaS computing capabilities through the use of respective executable applications and functions. In an example, a developer writes function code (e.g., "computer code" herein) representing one or more computer functions, and the function code is uploaded to a FaaS platform provided by, for example, an edge node or data center. A trigger such as, for example, a service use case or an edge processing event, initiates the execution of the function code with the FaaS platform.

In an example of FaaS, a container is used to provide an environment in which function code is executed. The container may be any isolated-execution entity such as a process, an orchestrator, a virtual machine, etc. Within the edge computing system, various datacenter, edge, and endpoint (including mobile) devices are used to "spin up" functions (e.g., activate and/or allocate function actions) that are scaled on demand. The function code gets executed on the physical infrastructure (e.g., edge computing node) device and underlying virtualized containers. Finally, the container is "spun down" (e.g., deactivated and/or deallocated) on the infrastructure in response to the execution being completed.

Further aspects of FaaS may enable deployment of edge functions in a service fashion, including support of respective functions that support edge computing as a service. Additional features of FaaS may include: a granular billing component that enables customers (e.g., computer code developers) to pay only when their code gets executed; common data storage to store data for reuse by one or more functions; orchestration and management among individual functions; function execution management, parallelism, and consolidation; management of container and function memory spaces; coordination of acceleration resources available for functions; and distribution of functions between containers (including "warm" containers, already deployed or operating, versus "cold" which require deployment or configuration).

Example IoT Architectures

Figure 4:
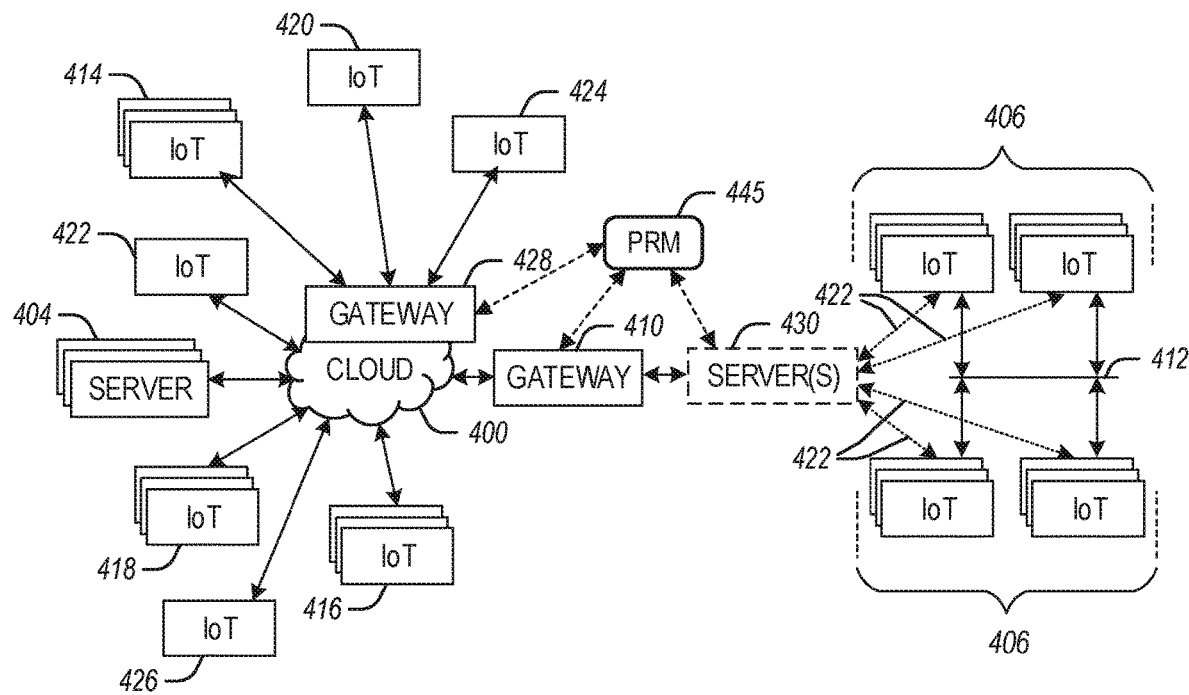
FIG. 4 illustrates a block diagram depicting deployment and communications among a number of Internet of Things (IoT) devices, according to an example.

As a more detailed illustration of an Internet of Things (IoT) network, FIG. 4 illustrates a drawing of a cloud or edge computing network, referred to as "cloud" 400, in communication with a number of IoT devices and a PRM 445. The IoT is a concept in which a large number of computing devices are interconnected to each other and to the Internet to provide functionality and data acquisition at very low levels. Thus, as used herein, an IoT device may include a semiautonomous device performing a function, such as sensing or control, among others, in communication with other IoT devices and a wider network, such as the Internet.

Often, IoT devices are limited in memory, size, or functionality, allowing larger numbers to be deployed for a similar (or lower) cost compared to the cost of smaller numbers of larger devices. However, an IoT device may be a smartphone, laptop, tablet, or PC, or other larger device. Further, an IoT device may be a virtual device, such as an application on a smartphone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

Returning to FIG. 4, the cloud 400 may represent the Internet or may be a local area network (LAN), or a wide area network (WAN), such as a proprietary network for a company. The IoT devices may include any number of different types of devices, grouped in various combinations. For example, a traffic control group 406 may include IoT devices along streets in a city. These IoT devices may include stoplights, traffic flow monitors, cameras, weather sensors, and the like. The traffic control group 406, or other subgroups, may be in communication with the cloud 400 through wired or wireless links 408, such as LPWA links, optical links, and the like. Further, a wired or wireless sub-network 412 may allow the IoT devices to communicate with each other, such as through a local area network, a wireless local area network, and the like. The IoT devices may use another device, such as a gateway 410 or 428 to communicate with remote locations such as the cloud 400; the IoT devices may also use one or more servers 430 to facilitate communication with the cloud 400 or with the gateway 410. For example, the one or more servers 430 may operate as an intermediate network node to support a local edge cloud or fog implementation among a local area network. Further, the gateway 428 that is depicted may operate in a cloud-to-gateway-to-many edge devices configuration, such as with the various IoT devices 414, 420, 424 being constrained or dynamic to an assignment and use of resources in the cloud 400.

In an example embodiment, the cloud 400 can further include a PRM 445 which is configured to perform platform resource management functions and techniques discussed herein (e.g., in connection with FIG. 8-FIG. 15). More specifically, PRM 445 can translate KPIs within one or more SLAs into low-level controls associated with platform resources of the gateway 410, gateway 428, servers 404, and servers 430 used within the cloud 400. The PRM 445 can further monitor such low-level controls and adjust platform resource usage to ensure compliance with the KPIs specified within the one or more SLAs.

Other example groups of IoT devices may include remote weather stations 414, local information terminals 416, alarm systems 418, automated teller machines 420, alarm panels 422, or moving vehicles, such as emergency vehicles 424 or other vehicles 426, among many others. Each of these IoT devices may be in communication with other IoT devices, with servers 404, with another IoT device or system, another edge computing or "fog" computing system, or a combination therein. The groups of IoT devices may be deployed in various residential, commercial, and industrial settings (including in both private or public environments).

As may be seen from FIG. 4, a large number of IoT devices may be communicating through the cloud 400. This may allow different IoT devices to request or provide information to other devices autonomously. For example, a group of IoT devices (e.g., the traffic control group 406) may request a current weather forecast from a group of remote weather stations 414, which may provide the forecast without human intervention. Further, an emergency vehicle 424 may be alerted by an automated teller machine 420 that a burglary is in progress. As the emergency vehicle 424 proceeds towards the automated teller machine 420, it may access the traffic control group 406 to request clearance to the location, for example, by lights turning red to block cross traffic at an intersection insufficient time for the emergency vehicle 424 to have unimpeded access to the intersection.

Clusters of IoT devices may be equipped to communicate with other IoT devices as well as with a cloud network. This may allow the IoT devices to form an ad-hoc network between the devices, allowing them to function as a single device, which may be termed a fog device or system. Clusters of IoT devices, such as may be provided by the remote weather stations 414 or the traffic control group 406, may be equipped to communicate with other IoT devices as well as with the cloud 400. This may allow the IoT devices to form an ad-hoc network between the devices, allowing them to function as a single device, which also may be termed a fog device or system.

In further examples, a variety of topologies may be used for IoT networks comprising IoT devices, with the IoT networks coupled through backbone links to respective gateways. For example, a number of IoT devices may communicate with a gateway, and with each other through the gateway. The backbone links may include any number of wired or wireless technologies, including optical networks, and may be part of a local area network (LAN), a wide area network (WAN), or the Internet. Additionally, such communication links facilitate optical signal paths among both IoT devices and gateways, including the use of MUXing/de-MUXing components that facilitate the interconnection of the various devices.

The network topology may include any number of types of IoT networks, such as a mesh network provided with the network using Bluetooth low energy (BLE) links. Other types of IoT networks that may be present include a wireless local area network (WLAN) network used to communicate with IoT devices through IEEE 802.11 (Wi-Fi®) links, a cellular network used to communicate with IoT devices through an LTE/LTE-A (4G) or 5G cellular network, and a low-power wide-area (LPWA) network, for example, a LPWA network compatible with the LoRaWan specification promulgated by the LoRa alliance, or a IPv6 over Low Power Wide-Area Networks (LPWAN) network compatible with a specification promulgated by the Internet Engineering Task Force (IETF).

Further, the respective IoT networks may communicate with an outside network provider (e.g., a tier 2 or tier 3 provider) using any number of communications links, such as an LTE cellular link, an LPWA link, or a link based on the IEEE 802.15.4 standard, such as Zigbee®. The respective IoT networks may also operate with the use of a variety of network and internet application protocols such as the Constrained Application Protocol (CoAP). The respective IoT networks may also be integrated with coordinator devices that provide a chain of links that forms a cluster tree of linked devices and networks.

IoT networks may be further enhanced by the integration of sensing technologies, such as sound, light, electronic traffic, facial and pattern recognition, smell, vibration, into the autonomous organizations among the IoT devices. The integration of sensory systems may allow systematic and autonomous communication and coordination of service delivery against contractual service objectives, orchestration, and quality of service (QoS) based swarming and fusion of resources.

An IoT network, arranged as a mesh network, for instance, may be enhanced by systems that perform inline data-to-information transforms. For example, self-forming chains of processing resources comprising a multi-link network may distribute the transformation of raw data to information in an efficient manner, and the ability to differentiate between assets and resources and the associated management of each. Furthermore, the proper components of infrastructure and resource-based trust and service indices may be inserted to improve the data integrity, quality, assurance and deliver a metric of data confidence.

An IoT network, arranged as a WLAN network, for instance, may use systems that perform standards conversion to provide multi-standard connectivity, enabling IoT devices using different protocols to communicate. Further systems may provide seamless interconnectivity across a multi-standard infrastructure comprising visible Internet resources and hidden Internet resources.

An IoT network, using communications in the cellular network, for instance, may be enhanced by systems that offload data, extend communications to more remote devices, or both. An LPWA network may include systems that perform non-Internet protocol (IP) to IP interconnections, addressing, and routing. Further, each of the IoT devices may include the appropriate transceiver for wide-area communications with that device. Further, each IoT device may include other transceivers for communications using additional protocols and frequencies.

In further examples, an edge or cloud computing network may be in communication with a mesh network of IoT devices at the edge of the cloud computing network. The mesh network of IoT devices may be termed a fog device or system, operating at the edge of the cloud. This fog device or system may be a massively interconnected network where a number of IoT devices are in communications with each other by radio links, for example. As an example, this interconnected network may be facilitated using an interconnect specification released by the Open Connectivity Foundation™ (OCF). This standard allows devices to discover each other and establish communications for interconnects. Other interconnection protocols may also be used, including, for example, the optimized link state routing (OLSR) Protocol, the better approach to mobile ad-hoc networking (B.A.T.M.A.N.) routing protocol, or the OMA Lightweight M2M (LWM2M) protocol, among others.

These and other examples of IoT networks may be enhanced with the following uses of platform resource management using the PRM 445, such as using the PRM-related functions described in connection with FIGS. 8-15. In this manner, an IoT device may be a client, which accesses a resource provided by gateway 410, gateway 428, servers 404, or servers 430, which may be monitored and configured by the PRM 445 within the cloud 400, based on KPIs within one or more SLAs specified for a container or service associated with the cloud 400.

Example MEC Architectures

Some of the techniques and configurations discussed with reference to MEC may be (but are not required to be) relevant to the standards and approaches published in ETSI GS MEC-003 "Mobile Edge Computing (MEC); Framework and Reference Architecture" (e.g., V2.0.3) and related MEC or networked operational implementations. However, while the present resource management techniques and configurations may provide significant benefits to MEC architectures, the applicability of the present techniques and configurations may be extended to any number of edge computing, IoT, fog, or distributed computing platforms.

MEC is intended to support developing mobile use cases of edge computing, to allow application developers and content providers to access computing capabilities and an IT service environment in dynamic settings at the edge of the network. MEC offers application developers and content providers cloud-computing capabilities and an IT service environment using equipment located closer to network (e.g., cellular network) edges. This environment is characterized by ultra-low latency and high bandwidth as well as real-time access to radio network information that may be leveraged by applications. MEC technology permits operators to flexibly and rapidly deploy innovative applications and services towards mobile subscribers, enterprises and vertical segments.

MEC, like other edge computing deployments, may reduce network congestion by operating applications, data functions, and discovery, etc. closer to the user (e.g., mobile device, user equipment (UE), station (STA), etc.). Some MEC details dealing with security (e.g., both user security as well as application integrity), radio use, etc., have been promulgated by European Telecommunications Standards Institute (ETSI), such as described in the "Mobile Edge Computing Introductory Technical White Paper," published Sep. 1, 2014. A set of specifications and white papers providing further details and implementation use cases for MEC scenarios is being developed and published on an ongoing basis by ETSI as part of the ETSI MEC industry specification group (ISG).

MEC architectures offer application developers and content providers cloud-computing capabilities and an IT service environment at the edge of the network. This environment is characterized by ultra-low latency and high bandwidth as well as real-time access to radio network information that can be leveraged by applications. MEC technology thus permits flexible and rapid deployment of innovative applications and services towards mobile subscribers, enterprises and vertical segments. For instance, in automotive settings, applications such as V2X (vehicle-to-everything, IEEE 802.11p based or 3GPP LTE-V2X based) may use MEC technology to exchange data, provide data to aggregation points, and access data in databases to provide and obtain an overview of the local situation derived from a multitude of sensors (by various cars, roadside units, etc.).

Figure 5:
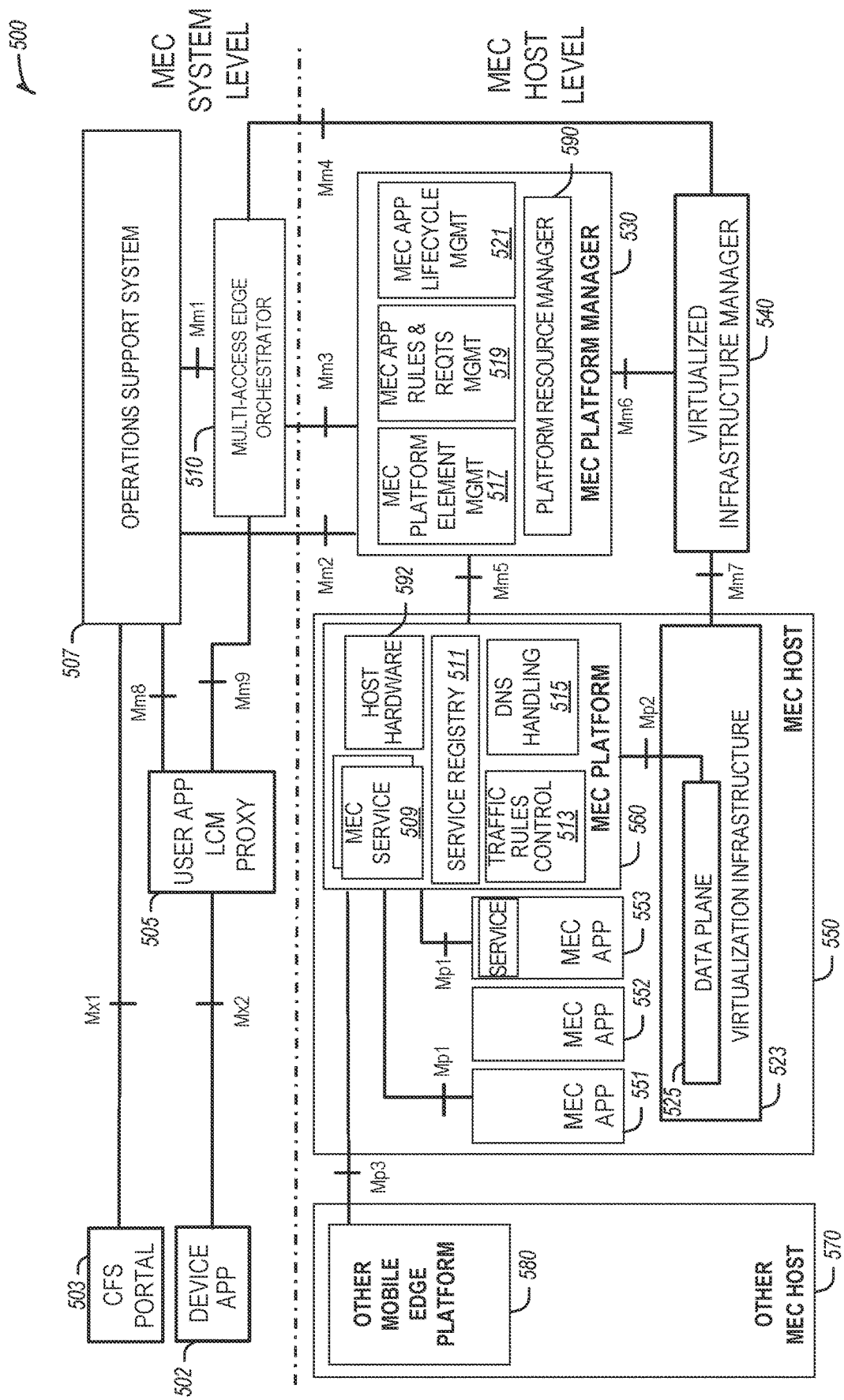
FIG. 5 illustrates a block diagram for a Multi-access Edge Computing (MEC) system architecture using a platform resource manager (PRM), according to an example.

FIG. 5 depicts a block diagram 500 for an example Multi-access Edge Computing (MEC) system architecture. In an example, the MEC system architecture may be defined according to a specification, standard, or other definition (e.g., according to the ETSI ISG MEC-003 specification). For example, the MEC system architecture of FIG. 5 includes the following components with functionalities described in greater detail in the ETSI GS MEC-003 (v1.1.1, 2016-03) specification: a customer-facing service (CFS) portal 503, a device application (app) 502, a user app lifecycle management (LCM) proxy 505, operations support system 507, multi-access edge orchestrator 510, a MEC platform 530, a virtualized infrastructure manager 540, a MEC host 550, and another MEC host 570 with another mobile edge platform 580. The MEC host 550 includes a virtualization infrastructure 523 with a data plane 525 MEC apps 551-553, and a MEC platform 560. The MEC platform includes one or more MEC services 509, host hardware 592, service registry 511, traffic rules control function 513, and DNS handling function 515. The MEC platform manager 530 includes a MEC platform element management function 517, MEC app rules and requirements management function 519, a MFC app lifecycle management function 521, and a platform resource manager 590. In this diagram, the illustrated Mp reference points refer to MEC platform functionality, the illustrated Mm reference points refer to management, and the illustrated Mx reference points refer to connections to external entities. The services, applications, orchestrators, and other entities discussed herein may be implemented at any number of the entities of the MEC system architecture depicted in FIG. 5, and the communications to perform network operations may be implemented at any number of the interfaces of the MEC system architecture depicted in FIG. 5.

Figure 8:
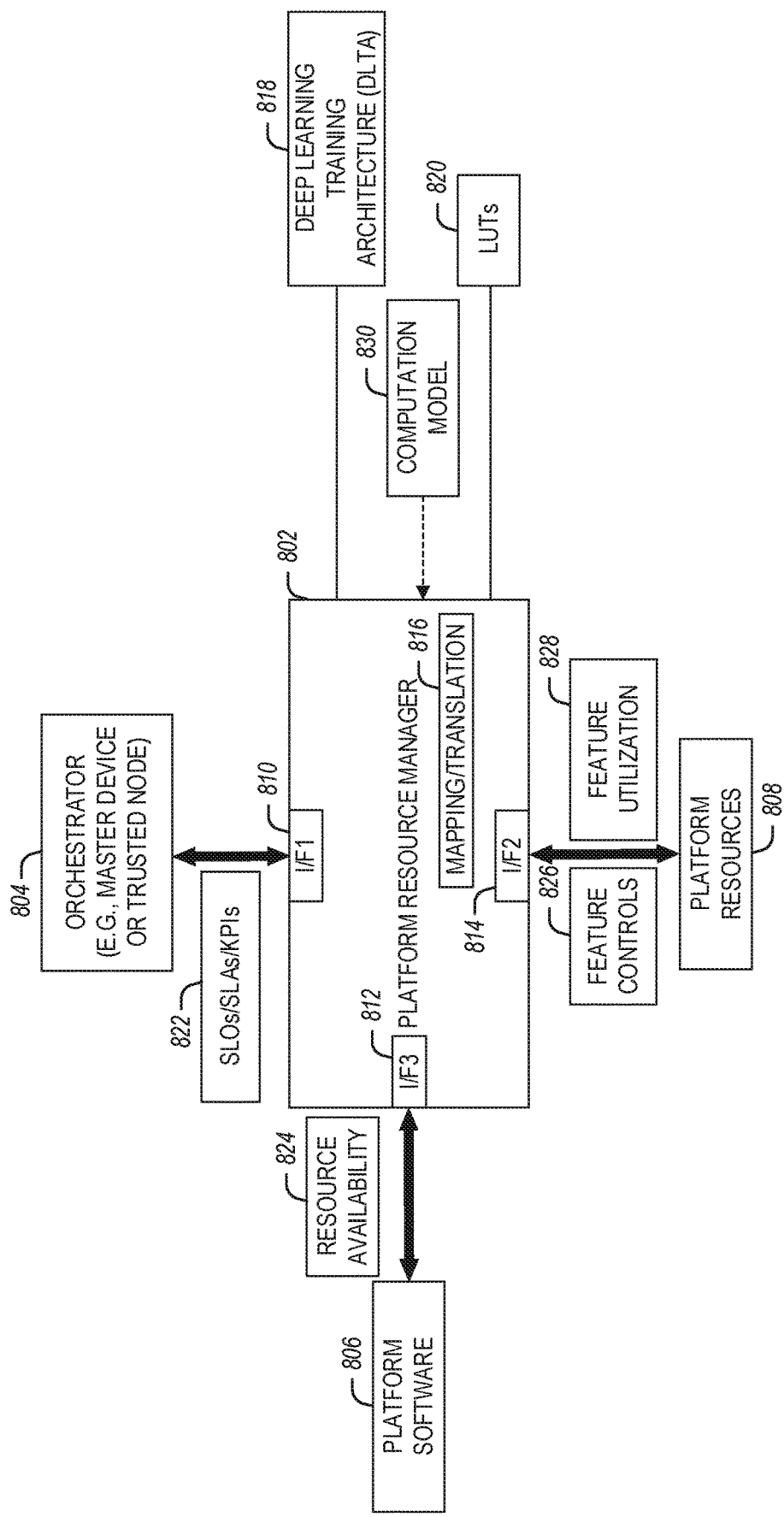
FIG. 8 illustrates a block diagram of a platform resource manager (PRM) using a deep learning training architecture (DLTA), according to an example.
Figure 9:
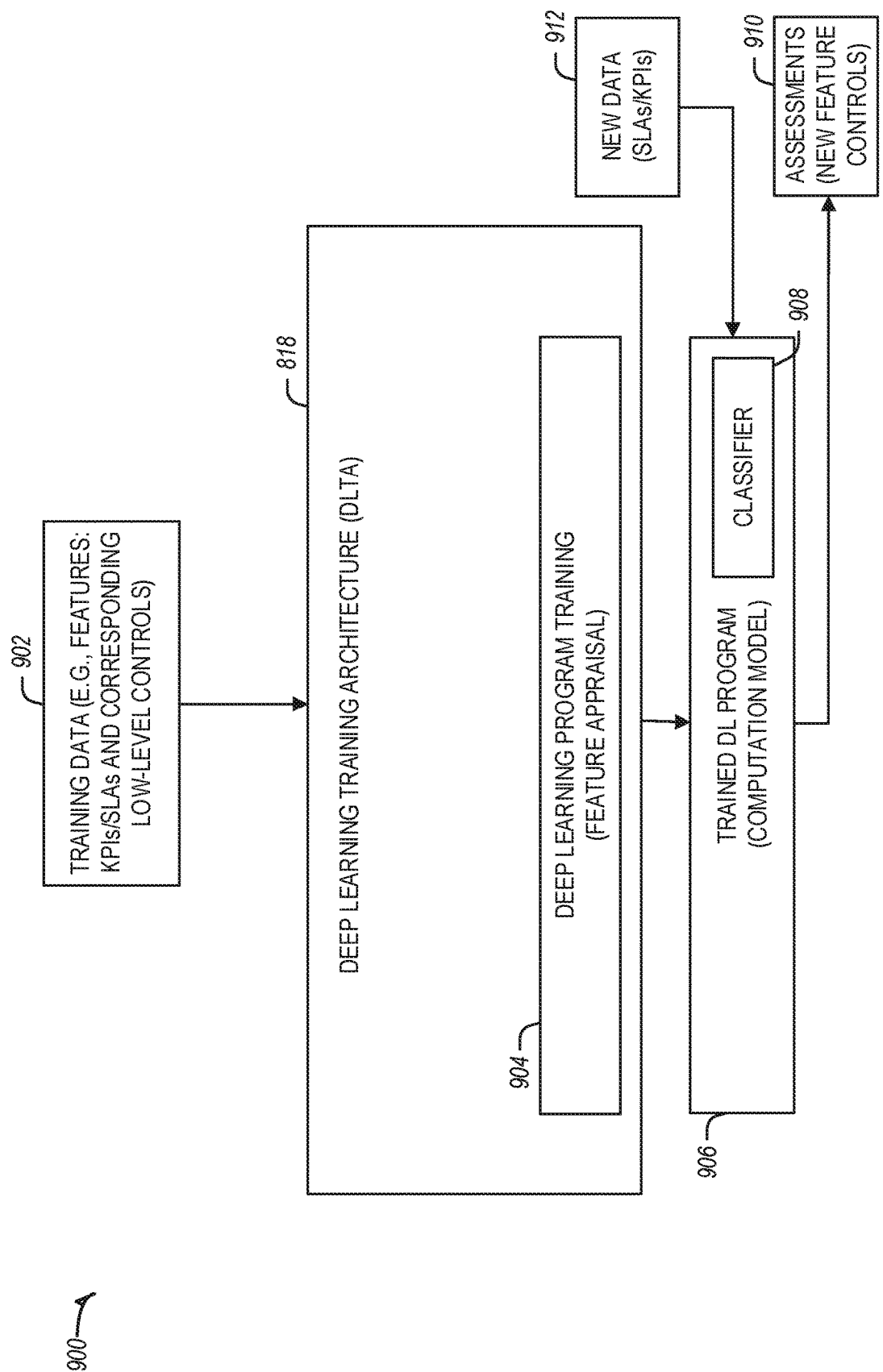
FIG. 9 is a block diagram illustrating the training of a deep learning (DL) program using the DLTA of FIG. 8, according to an example.
Figure 10:
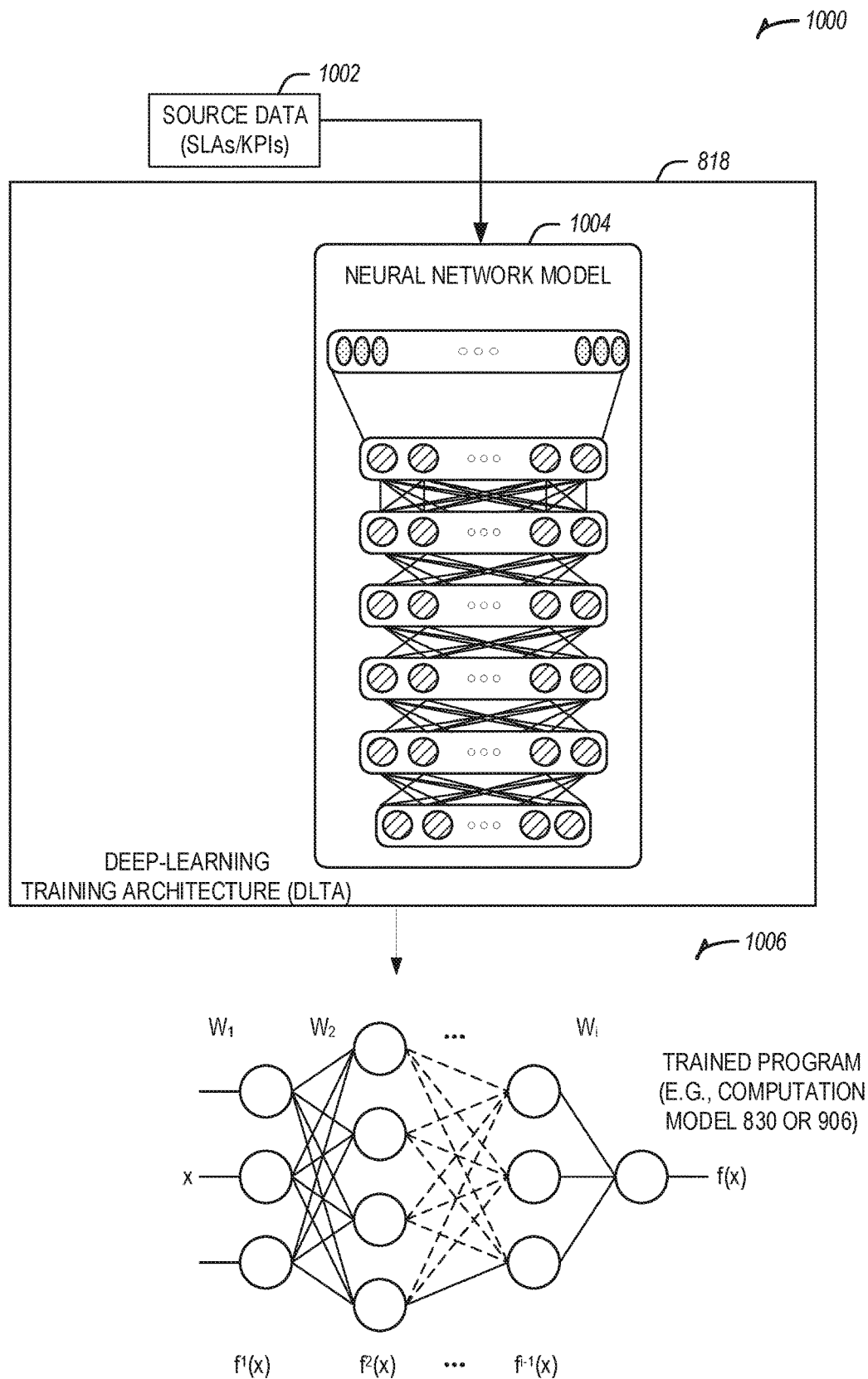
FIG. 10 is a diagram illustrating generation of a trained DL program using a neural network model trained within the DLTA of FIG. 8, according to an example.

For instance, a device application 502 operating at a client user equipment device (e.g., smartphone) may access a multi-access edge orchestrator 510, to obtain SLA information from an orchestrator as further detailed in FIGS. 8-10. A MEC Host 550 may operate one or more MEC applications 551, 552, 553 or a platform 560 using host hardware 592, which may be managed by the PRM 590 within the MEC platform manager 530 using the SLA information received from the orchestrator 510. A virtualized infrastructure manager 540 and the MEC platform manager 530 provide management of the use of the hosts, platforms, and resources, using platform management techniques in connection with the PRM 590. The virtualized infrastructure manager 540 and the MEC platform manager 530 may also the PRM 590 to provide managed access to other MEC hosts (e.g., host 570) or MEC platforms (e.g., platform 580), which may also be involved with uses of platform resource management functions as described herein.

FIG. 5 illustrates a remote/distributed implementation of the PRM 590 (e.g., the PRM 590 is outside of the MEC host). However, the disclosure is not limited in this regard and the PRM 590 may be implemented within the MEC host 550 or another network entity.

Example Computing Devices

Figure 6:
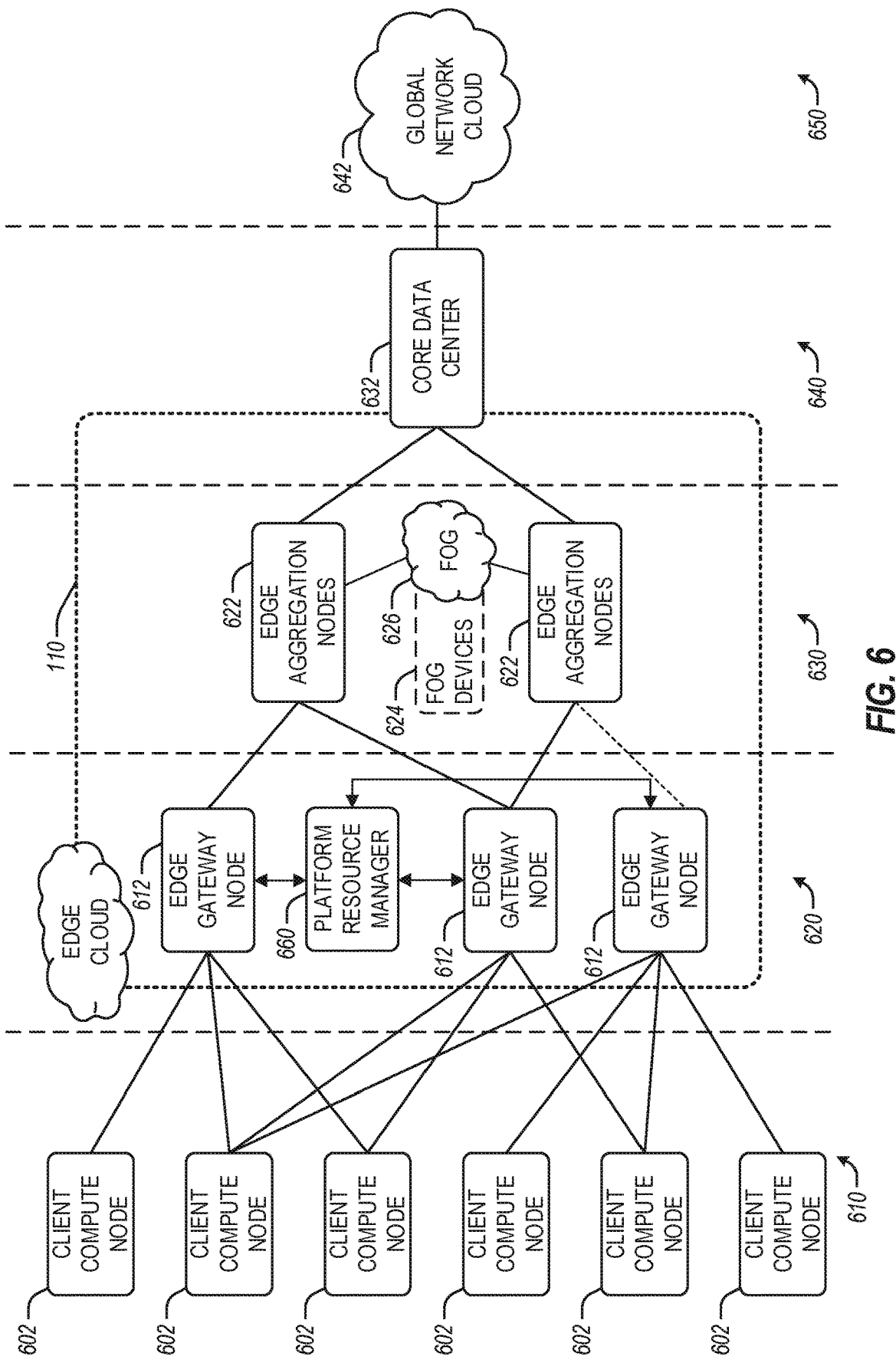
FIG. 6 illustrates an overview of layers of distributed compute deployed among an edge computing system, according to an example.

At a more generic level, an edge computing system may be described to encompass any number of deployments operating in the edge cloud 110, which provide coordination from client and distributed computing devices. FIG. 6 provides a further abstracted overview of layers of distributed compute deployed among an edge computing environment for purposes of illustration.

FIG. 6 generically depicts an edge computing system for providing edge services and applications to multi-stakeholder entities, as distributed among one or more client compute nodes 602, one or more edge gateway nodes 612, one or more edge aggregation nodes 622, one or more core data centers 632, and a global network cloud 642, as distributed across layers of the network. The implementation of the edge computing system may be provided at or on behalf of a telecommunication service provider ("telco", or "TSP"), internet-of-things service provider, a cloud service provider (CSP), enterprise entity, or any other number of entities. Various forms of wired or wireless connections may be configured to establish connectivity among the nodes 602, 612, 622, 632, including interconnections among such nodes (e.g., connections among edge gateway nodes 612, and connections among edge aggregation nodes 622).

Each node or device of the edge computing system is located at a particular layer corresponding to layers 610, 620, 630, 640, and 650. For example, the client compute nodes 602 are each located at an endpoint layer 610, while each of the edge gateway nodes 612 is located at an edge devices layer 620 (local level) of the edge computing system. Additionally, each of the edge aggregation nodes 622 (and/or fog devices 624, if arranged or operated with or among a fog networking configuration 626) is located at a network access layer 630 (an intermediate level). Fog computing (or "fogging") generally refers to extensions of cloud computing to the edge of an enterprise's network, typically in a coordinated distributed or multi-node network. Some forms of fog computing provide the deployment of compute, storage, and networking services between end devices and cloud computing data centers, on behalf of the cloud computing locations. Such forms of fog computing provide operations that are consistent with edge computing as discussed herein; many of the edge computing aspects discussed herein are applicable to fog networks, fogging, and fog configurations. Further, aspects of the edge computing systems discussed herein may be configured as a fog, or aspects of a fog may be integrated into an edge computing architecture.

The core data center 632 is located at a core network layer 640 (e.g., a regional or geographically-central level), while the global network cloud 642 is located at a cloud data center layer 650 (e.g., a national or global layer). The use of "core" is provided as a term for a centralized network location—deeper in the network—which is accessible by multiple edge nodes or components; however, a "core" does not necessarily designate the "center" or the deepest location of the network. Accordingly, the core data center 632 may be located within, at, or near the edge cloud 110.

Although an illustrative number of client compute nodes 602, edge gateway nodes 612, edge aggregation nodes 622, core data centers 632, and global network clouds 642 are shown in FIG. 6, it should be appreciated that the edge computing system may include more or fewer devices or systems at each layer. Additionally, as shown in FIG. 6, the number of components of each layer 610, 620, 630, 640, and 650 generally increases at each lower level (i.e., when moving closer to endpoints). As such, one edge gateway node 612 may service multiple client compute nodes 602, and one edge aggregation node 622 may service multiple edge gateway nodes 612.

Consistent with the examples provided herein, each client compute node 602 may be embodied as any type of end point component, device, appliance, or "thing" capable of communicating as a producer or consumer of data. Further, the label "node" or "device" as used in the edge computing system 600 does not necessarily mean that such node or device operates in a client or slave role; rather, any of the nodes or devices in the edge computing system 600 refer to individual entities, nodes, or subsystems which include discrete or connected hardware or software configurations to facilitate or use the edge cloud 110.

As such, the edge cloud 110 is formed from network components and functional features operated by and within the edge gateway nodes 612 and the edge aggregation nodes 622 of layers 620, 630, respectively. The edge cloud 110 may be embodied as any type of network that provides edge computing and/or storage resources which are proximately located to radio access network (RAN) capable endpoint devices (e.g., mobile computing devices, IoT devices, smart devices, etc.), which are shown in FIG. 6 as the client compute nodes 602. In other words, the edge cloud 110 may be envisioned as an "edge" which connects the endpoint devices and traditional mobile network access points that serves as an ingress point into service provider core networks, including carrier networks (e.g., Global System for Mobile Communications (GSM) networks, Long-Term Evolution (LTE) networks, 5G networks, etc.), while also providing storage and/or compute capabilities. Other types and forms of network access (e.g., Wi-Fi, long-range wireless networks) may also be utilized in place of or in combination with such 3GPP carrier networks.

In some examples, the edge cloud 110 may form a portion of or otherwise provide an ingress point into or across a fog networking configuration 626 (e.g., a network of fog devices 624, not shown in detail), which may be embodied as a system-level horizontal and distributed architecture that distributes resources and services to perform a specific function. For instance, a coordinated and distributed network of fog devices 624 may perform computing, storage, control, or networking aspects in the context of an IoT system arrangement. Other networked, aggregated, and distributed functions may exist in the edge cloud 110 between the cloud data center layer 650 and the client endpoints (e.g., client compute nodes 602). Some of these are discussed in the following sections in the context of network functions or service virtualization, including the use of virtual edges and virtual services which are orchestrated for multiple stakeholders.

The edge gateway nodes 612 and the edge aggregation nodes 622 cooperate to provide various edge services and security to the client compute nodes 602. Furthermore, because each client compute node 602 may be stationary or mobile, each edge gateway node 612 may cooperate with other edge gateway devices to propagate presently provided edge services and security as the corresponding client compute node 602 moves about a region. To do so, each of the edge gateway nodes 612 and/or edge aggregation nodes 622 may support multiple tenancies and multiple stakeholder configurations, in which services from (or hosted for) multiple service providers and multiple consumers may be supported and coordinated across a single or multiple compute devices.

In various examples, the present platform resource management techniques may be implemented among the client compute nodes 602, the edge gateway nodes 612, the aggregation nodes 622, and other intermediate nodes in the edge cloud 110 (e.g., which operate orchestrator functions or other node management functions, etc.), as further discussed below with reference to FIGS. 8-15. For example, the edge cloud 110 may include a PRM 660 which is configured to perform platform resource management functions and techniques discussed herein (e.g., in connection with FIG. 8-FIG. 15). More specifically, PRM 660 comprises suitable circuitry, logic, interfaces, and/or code and is configured to translate KPIs within one or more SLAs into low-level controls associated with platform resources of the client compute nodes 602, the edge gateway nodes 612, the aggregation nodes 622, and other intermediate nodes in the edge cloud 110. The PRM 660 can further monitor such low-level controls and adjust platform resource usage to ensure compliance with the KPIs specified within the one or more SLAs.

In further examples, any of the compute nodes or devices discussed with reference to the present edge computing systems and environment may be fulfilled based on the components depicted in FIGS. 7A and 7B. Each edge compute node may be embodied as a type of device, appliance, computer, or other "thing" capable of communicating with other edges, networking, or endpoint components. For example, an edge compute device may be embodied as a smartphone, a mobile compute device, a smart appliance, an in-vehicle compute system (e.g., a navigation system), or other device or system capable of performing the described functions.

Figure 7A:
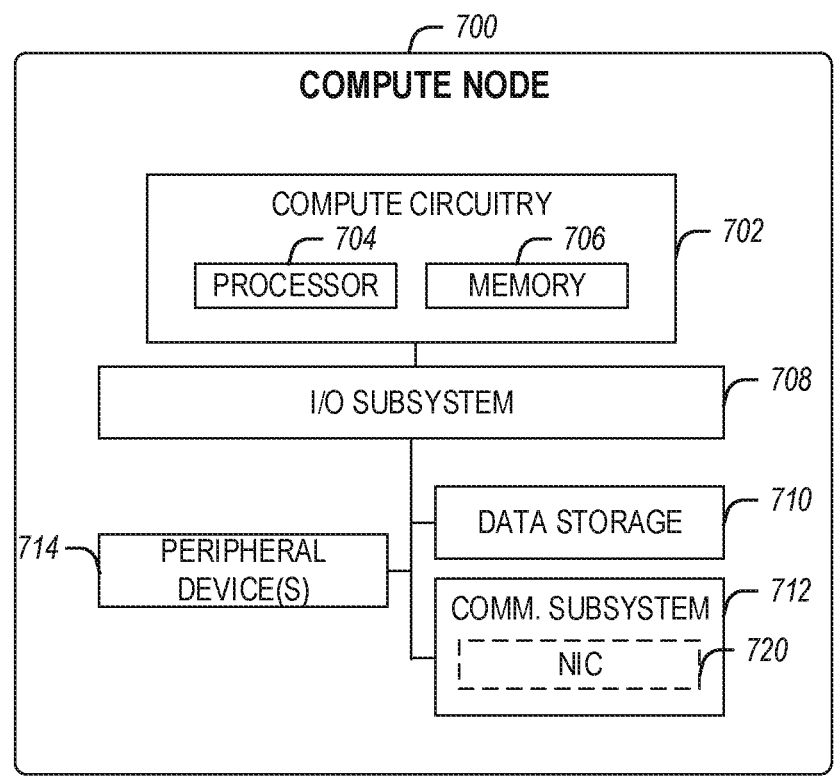
FIG. 7A illustrates an overview of example components deployed at a compute node system, according to an example.

In the simplified example depicted in FIG. 7A, an edge compute node 700 includes a compute engine (also referred to herein as "compute circuitry") 702, an input/output (I/O) subsystem 708, data storage 710, a communication circuitry subsystem 712, and, optionally, one or more peripheral devices 714. In other examples, each compute device may include other or additional components, such as those used in personal or server computing systems (e.g., a display, peripheral devices, etc.). Additionally, in some examples, one or more of the illustrative components may be incorporated in, or otherwise form a portion of, another component.

The compute node 700 may be embodied as any type of engine, device, or collection of devices capable of performing various compute functions. In some examples, the compute node 700 may be embodied as a single device such as an integrated circuit, an embedded system, a field-programmable gate array (FPGA), a system-on-a-chip (SOC), or other integrated system or device. In the illustrative example, the compute node 700 includes or is embodied as a processor 704 and a memory 706. The processor 704 may be embodied as any type of processor capable of performing the functions described herein (e.g., executing an application). For example, the processor 704 may be embodied as a multi-core processor(s), a microcontroller, or other processor or processing/controlling circuit. In some examples, the processor 704 may be embodied as, include, or be coupled to an FPGA, an application-specific integrated circuit (ASIC), reconfigurable hardware or hardware circuitry, or other specialized hardware to facilitate the performance of the functions described herein.

The main memory 706 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM).

In one example, the memory device is a block addressable memory device, such as those based on NAND or NOR technologies. A memory device may also include a three-dimensional crosspoint memory device (e.g., Intel 3D XPoint™ memory), or other byte-addressable write-in-place nonvolatile memory devices. The memory device may refer to the die itself and/or to a packaged memory product. In some examples, 3D crosspoint memory (e.g., Intel 3D XPoint™ memory) may comprise a transistor-less stackable cross-point architecture in which memory cells sit at the intersection of word lines and bit lines and are individually addressable and in which bit storage is based on a change in bulk resistance. In some examples, all or a portion of the main memory 706 may be integrated into the processor 704. The main memory 706 may store various software and data used during operation such as one or more applications, data operated on by the application(s), libraries, and drivers.

The compute circuitry 702 is communicatively coupled to other components of the compute node 700 via the I/O subsystem 708, which may be embodied as circuitry and/or components to facilitate input/output operations with the compute circuitry 702 (e.g., with the processor 704 and/or the main memory 706) and other components of the compute circuitry 702. For example, the I/O subsystem 708 may be embodied as, or otherwise include memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some examples, the I/O subsystem 708 may form a portion of a system-on-a-chip (SoC) and be incorporated, along with one or more of the processor 704, the main memory 706, and other components of the compute circuitry 702, into the compute circuitry 702.

The one or more illustrative data storage devices 710 may be embodied as any type of device configured for short-term or long-term storage of data such as, for example, memory devices and circuits, memory cards, hard disk drives, solid-state drives, or other data storage devices. Each data storage device 710 may include a system partition that stores data and firmware code for the data storage device 710. Each data storage device 710 may also include one or more operating system partitions that store data files and executables for operating systems depending on, for example, the type of compute node 700.

The communication circuitry 712 may be embodied as any communication circuit, device, or collection thereof, capable of enabling communications over a network between the compute circuitry 702 and another compute device (e.g., an edge gateway node 612 of the edge computing system 600). The communication circuitry 712 may be configured to use any one or more communication technology (e.g., wired or wireless communications) and associated protocols (e.g., a cellular networking protocol such a 3GPP 4G or 5G standard, a wireless local area network protocol such as IEEE 802.11/Wi-Fi®, a wireless wide area network protocol, Ethernet, Bluetooth®, etc.) to effect such communication.

The illustrative communication circuitry 712 includes a network interface controller (NIC) 720, which may also be referred to as a host fabric interface (HFI). The NIC 720 may be embodied as one or more add-in-boards, daughter cards, network interface cards, controller chips, chipsets, or other devices that may be used by the compute node 700 to connect with another compute device (e.g., an edge gateway node 612). In some examples, the NIC 720 may be embodied as part of a system-on-a-chip (SoC) that includes one or more processors or included on a multichip package that also contains one or more processors. In some examples, the NIC 720 may include a local processor (not shown) and/or a local memory and storage (not shown) that are local to the NIC 720. In such examples, the local processor of the NIC 720 (which can include general purpose accelerators or specific accelerators) may be capable of performing one or more of the functions of the compute circuitry 702 described herein. Additionally, or alternatively, in such examples, the local memory of the NIC 720 may be integrated into one or more components of the client compute node at the board level, socket level, chip level, and/or other levels.

Additionally, in some examples, each compute node 700 may include one or more peripheral devices 714. Such peripheral devices 714 may include any type of peripheral device found in a compute device or server such as audio input devices, a display, other input/output devices, interface devices, and/or other peripheral devices, depending on the particular type of the compute node 700. In further examples, the compute node 700 may be embodied by a respective edge compute node in an edge computing system (e.g., client compute node 602, edge gateway node 612, edge aggregation node 622) or like forms of appliances, computers, subsystems, circuitry, or other components.

Figure 7B:
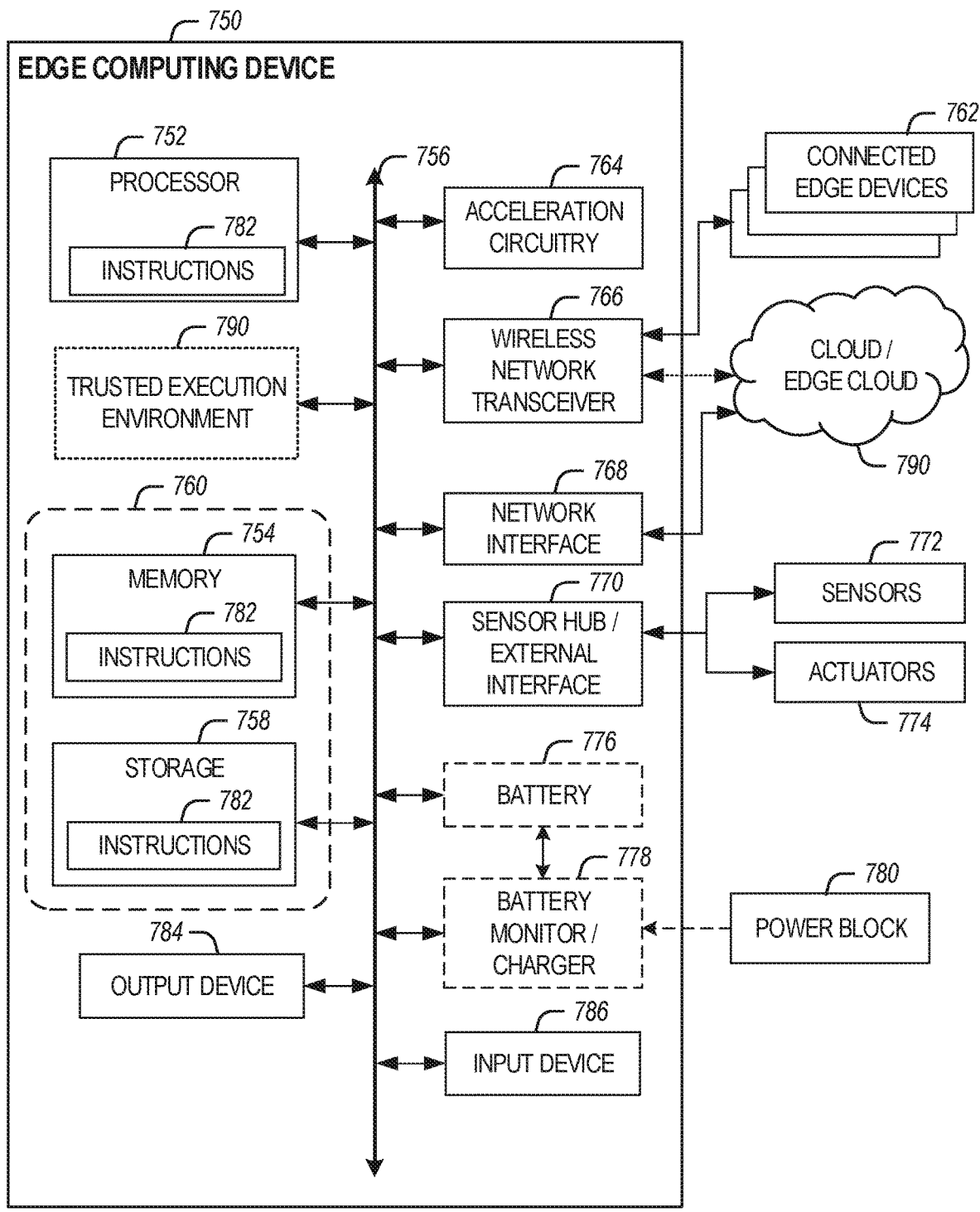
FIG. 7B illustrates a further overview of example components within a computing device, according to an example.

In a more detailed example, FIG. 7B illustrates a block diagram of an example of components that may be present in an edge computing device (or node) 750 for implementing the techniques (e.g., operations, processes, methods, and methodologies) described herein. The edge computing node 750 may include any combinations of the components referenced above, and it may include any device usable with an edge communication network or a combination of such networks. The components may be implemented as ICs, portions thereof, discrete electronic devices, or other modules, logic, hardware, software, firmware, or a combination thereof adapted in the edge computing node 750, or as components otherwise incorporated within a chassis of a larger system.

The edge computing node 750 may include processing circuitry in the form of a processor 752, which may be a microprocessor, a multi-core processor, a multithreaded processor, an ultra-low voltage processor, an embedded processor, or other known processing elements. The processor 752 may be a part of a system on a chip (SoC) in which the processor 752 and other components are formed into a single integrated circuit, or a single package, such as the Edison™ or Galileo™ SoC boards from Intel Corporation, Santa Clara, Calif. As an example, the processor 752 may include an Intel® Architecture Core™ based processor, such as a Quark™, an Atom™, an i3, an i5, an i7, an i9, or an MCU-class processor, or another such processor available from Intel®. However, any number other processors may be used, such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or a customer thereof, or their licensees or adopters. The processors may include units such as an A5-A12 processor from Apple® Inc., a Snapdragon™ processor from Qualcomm® Technologies, Inc., or an OMAP™ processor from Texas Instruments, Inc.

The processor 752 may communicate with a system memory 754 over an interconnect 756 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 758 may also couple to the processor 752 via the interconnect 756. In an example, the storage 758 may be implemented via a solid-state disk drive (SSDD). Other devices that may be used for the storage 758 include flash memory cards, such as SD cards, microSD cards, XD picture cards, and the like, and USB flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin-transfer torque (STT)-MRAM, a spintronic magnetic junction memory-based device, a magnetic tunneling junction (MTJ) based device, a DW (Domain Wall) and SOT (Spin-Orbit Transfer) based device, a thyristor-based memory device, or a combination of any of the above, or other memory.

In low power implementations, the storage 758 may be on-die memory or registers associated with the processor 752. However, in some examples, the storage 758 may be implemented using a micro hard disk drive (HDD) or solid state drive (SSD). Further, any number of new technologies may be used for the storage 758 in addition to, or instead of, the technologies described, such resistance change memories, phase change memories, holographic memories, or chemical memories, among others.

The components may communicate over the interconnect 756. The interconnect 756 may include any number of technologies, including industry-standard architecture (ISA), extended ISA (EISA), peripheral component interconnect (PCI), peripheral component interconnect extended (PCIx), PCI express (PCIe), or any number of other technologies. The interconnect 756 may be a proprietary bus, for example, used in an SoC based system. Other bus systems may be included, such as an 12C interface, an SPI interface, point to point interfaces, and a power bus, among others.

The interconnect 756 may couple the processor 752 to a transceiver 766, for communications with the connected edge devices 762. The transceiver 766 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 762. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 766 (or multiple transceivers) may communicate using multiple standards or radios for communications at a different range. For example, the edge computing node 750 may communicate with close devices, e.g., within about 10 meters, using a local transceiver based on BLE, or another low power radio, to save power. More distant connected edge devices 762, e.g., within about 50 meters, may be reached over ZigBee or other intermediate power radios. Both communications techniques may take place over a single radio at different power levels or may take place over separate transceivers, for example, a local transceiver using BLE and a separate mesh transceiver using ZigBee.

A wireless network transceiver 766 (e.g., a radio transceiver) may be included to communicate with devices or services in the edge cloud 790 via local or wide area network protocols. The wireless network transceiver 766 may be an LPWA transceiver that follows the IEEE 802.15.4, or IEEE 802.15.4g standards, among others. The edge computing node 750 may communicate over a wide area using LoRaWAN™ (Long Range Wide Area Network) developed by Semtech and the LoRa Alliance. The techniques described herein are not limited to these technologies but may be used with any number of other cloud transceivers that implement long-range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 766, as described herein. For example, the transceiver 766 may include a cellular transceiver that uses spread spectrum (SPA/SAS) communications for implementing high-speed communications. Further, any number of other protocols may be used, such as Wi-Fi® networks for medium speed communications and provision of network communications. The transceiver 766 may include radios that are compatible with any number of 3GPP (Third Generation Partnership Project) specifications, such as Long Term Evolution (LTE) and 5th Generation (5G) communication systems, discussed in further detail at the end of the present disclosure. A network interface controller (NIC) 768 may be included to provide a wired communication to nodes of the edge cloud 790 or to other devices, such as the connected edge devices 762 (e.g., operating in a mesh). The wired communication may provide an Ethernet connection or may be based on other types of networks, such as Controller Area Network (CAN), Local Interconnect Network (LIN), DeviceNet, ControlNet, Data Highway+, PROFIBUS, or PROFINET, Time Sensitive Networks (TSN), among many others. An additional NIC 768 may be included to enable connecting to a second network, for example, a first NIC 768 providing communications to the cloud over Ethernet, and a second NIC 768 providing communications to other devices over another type of network.

Given the variety of types of applicable communications from the device to another component or network, applicable communications circuitry used by the device may include or be embodied by any one or more of components 764, 766, 768, or 770. Accordingly, in various examples, applicable means for communicating (e.g., receiving, transmitting, etc.) may be embodied by such communications circuitry.

The edge computing node 750 may include or be coupled to acceleration circuitry 764, which may be embodied by one or more AI accelerators, a neural compute stick, neuromorphic hardware, an FPGA, an arrangement of GPUs, one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), visual data processing, network data processing, object detection, rule analysis, or the like. Accordingly, in various examples, applicable means for acceleration may be embodied by such acceleration circuitry.

The interconnect 756 may couple the processor 752 to a sensor hub or external interface 770 that is used to connect additional devices or subsystems. The devices may include sensors 772, such as accelerometers, level sensors, flow sensors, optical light sensors, camera sensors, temperature sensors, a global positioning system (GPS) sensors, pressure sensors, barometric pressure sensors, and the like. The hub or interface 770 further may be used to connect the edge computing node 750 to actuators 774, such as power switches, valve actuators, an audible sound generator, a visual warning device, and the like.

In some optional examples, various input/output (I/O) devices may be present within or connected to, the edge computing node 750. For example, a display or other output device 784 may be included to show information, such as sensor readings or actuator position. An input device 786, such as a touch screen or keypad may be included to accept input. An output device 784 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the edge computing node 750.

A battery 776 may power the edge computing node 750, although, in examples in which the edge computing node 750 is mounted in a fixed location, it may have a power supply coupled to an electrical grid. The battery 776 may be a lithium-ion battery, or a metal-air battery, such as a zinc-air battery, an aluminum-air battery, a lithium-air battery, and the like.

A battery monitor/charger 778 may be included in the edge computing node 750 to track the state of charge (SoCh) of the battery 776. The battery monitor/charger 778 may be used to monitor other parameters of the battery 776 to provide failure predictions, such as the state of health (SoH) and the state of function (SoF) of the battery 776. The battery monitor/charger 778 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex. The battery monitor/charger 778 may communicate the information on the battery 776 to the processor 752 over the interconnect 756. The battery monitor/charger 778 may also include an analog-to-digital (ADC) converter that enables the processor 752 to directly monitor the voltage of the battery 776 or the current flow from the battery 776. The battery parameters may be used to determine actions that the edge computing node 750 may perform, such as transmission frequency, mesh network operation, sensing frequency, and the like.

A power block 780, or other power supply coupled to a grid, may be coupled with the battery monitor/charger 778 to charge the battery 776. In some examples, the power block 780 may be replaced with a wireless power receiver to obtain the power wirelessly, for example, through a loop antenna in the edge computing node 750. A wireless battery charging circuit, such as an LTC4020 chip from Linear Technologies of Milpitas, Calif., among others, may be included in the battery monitor/charger 778. The specific charging circuits may be selected based on the size of the battery 776, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 758 may include instructions 782 in the form of software, firmware, or hardware commands to implement the techniques described herein. Although such instructions 782 are shown as code blocks included in the memory 754 and the storage 758, it may be understood that any of the code blocks may be replaced with hardwired circuits, for example, built into an application-specific integrated circuit (ASIC).

In an example, the instructions 782 provided via memory 754, the storage 758, or the processor 752 may be embodied as a non-transitory, machine-readable medium 760 including code to direct the processor 752 to perform electronic operations in the edge computing node 750. The processor 752 may access the non-transitory, machine-readable medium 760 over the interconnect 756. For instance, the non-transitory, machine-readable medium 760 may be embodied by devices described for the storage 758 or may include specific storage units such as optical disks, flash drives, or any number of other hardware devices. The non-transitory, machine-readable medium 760 may include instructions to direct the processor 752 to perform a specific sequence or flow of actions, for example, as described with respect to the flowchart(s) and block diagram(s) of operations and functionality depicted above. As used in, the terms "machine-readable medium" and "computer-readable medium" are interchangeable.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

Each of the block diagrams of FIGS. 7A and 7B are intended to depict a high-level view of components of a device, subsystem, or arrangement of an edge computing node. However, it will be understood that some of the components shown may be omitted, additional components may be present, and a different arrangement of the components shown may occur in other implementations.

Platform Resource Management Examples

In the context of a deployed system (such as the IoT system depicted in FIG. 4, the MEC system depicted in FIG. 5, the edge computing system depicted in FIG. 6, or like variations of distributed computing architectures) the present techniques and configurations provide the capability for configuring and managing platform resources using KPIs specified within one or more SLAs.

In contrast to the platform resource management techniques described herein, conventional approaches for resource management expose only basic platform telemetry, such as CPU utilization or network utilization. Additionally, conventional approaches are not based on SLAs that specify KPIs with lower granularity, such as at the level of a container or an edge service executing on one or more edge computing devices. Existing approaches also do not take into account dynamic changes in resource availability in order to adjust low-level controls for providing fine-grained measurements and ensuring compliance with the SLAs. Finally, existing approaches for resource management do not translate (or map) KPIs or other requirements specified in SLAs.

These and other disadvantages of conventional or existing approaches are addressed by the following techniques and configurations for platforming resource management. More specifically, resource management techniques discussed herein use a PRM that exposes to application developers an interface for specifying high-level KPIs at the granularity of individual processes or containers, and which translates these into a set of lower-level controls that can be set on the various underlying platform resources. The proposed PRM may be further configured to monitor these resources to ensure that the KPIs are being met and adjusts the low-level controls accordingly. Additionally, the proposed PRM also supports the concept of "nested PRMs", whereby resources can be granted by a master (or parent) PRM to an entity, such as a virtual machine (VM), and the VM can use a child PRM to allocate and manage those resources among applications or processes within that VM.

FIG. 8 illustrates a block diagram of a platform resource manager (PRM) 802 using a deep learning training architecture (DLTA) 818, according to an example. Referring to FIG. 8, the PRM 802 uses a first interface 810 to communicate with an orchestrator node 804 to receive one or more SLAs (and/or Service Level Objectives, or SLOs) 822. The SLAs 822 can specify KPIs at the granularity of individual containers or edge services. More specifically, the SLAs 822 can define the usage of an accessible feature (e.g., a resource or service) associated with an edge computing device. An edge service can be represented by at least one edge service instance that includes include multiple containers. In this regard, an SLA that is associated with an edge service can provide KPIs at the granularity of an edge service instance (e.g., KPIs are associated with the multiple containers of the edge service instance that represents the edge service) or at the granularity of an individual container (e.g., KPIs are associated with an individual container of the multiple containers of the edge service instance). The use of a single or multiple SLAs in connection with a container or an edge service is illustrated in connection with FIG. 12 and FIGS. 13A-13B.

Even though FIG. 8 illustrates the network entity 804 that provides the one or more SLAs 822 to the PRM 802 as an orchestrator, the disclosure is not limited in this regard and other types of network entities may perform this functionality. For example, a network entity 804 can be a master device, a trusted node, or another type of edge computing device configured to provide the SLAs to the PRM 802.

The PRM 802 further includes interface 812, which can be used for communication with platform software 806 to obtain resource availability 824. Platform software 806 can include an edge computing device operating system, a hypervisor, or other types of platform software configured to communicate the resource availability 824 to the PRM 802 via interface 812. In an example embodiment, platform software 806 can communicate with the PRM 802 via a sideband application programming interface (API) or another type of API. The sideband API may be available primarily to the operating system and/or hypervisor software. Using the sideband API, drivers for various hardware resources in an edge platform (e.g., edge computing device) may communicate the availability and non-availability of resources to PRM 802. The majority of static resources, such as the available memory bandwidth or cache capacity, or power and thermal limits of the platform, may be communicated to PRM 802 through a PRM driver that initializes the PRM during the boot phase.

After the PRM 802 receives the one or more SLAs 822 from the orchestrator node 804, the PRM 802 performs mapping/translation functions 816 to map (or translate) the defined usage of the accessible feature as specified by the one or more SLAs 822 to a plurality of feature controls 826 (e.g., low-level resource controls) using a computation model 830 or one or more lookup tables (LUTs) 820. In some embodiments, computation model 830 is generated by a deep learning training architecture (DLTA) 818, as described in greater detail in connection with FIG. 9 in FIG. 10.

The PRM 802 uses interface 814 to set the determined feature controls 826 (e.g., a set of lower-level controls or "knobs") on the available platform resources 808. The PRM 802 than monitors the platform resources 808 based on the set feature controls 826 to obtain feature utilization information 828. If the feature utilization information 828 indicates noncompliance with the one or more SLAs 822, remedial action can be performed. The remedial action can include adjusting the mapping/translation functions 816, adjusting the allocation of the platform resources 808 (e.g., platform resources used by an edge computing device to execute a container or an edge service associated with the SLAs), or adjust one or more weights associated with the computation model 830 (e.g., in connection with the retraining of the computation model 830 by the DLTA 818).

FIG. 9 is a block diagram 900 illustrating the training of a deep learning (DL) program using the DLTA 818 of FIG. 8, according to an example. In some example embodiments, machine-learning programs (MLPs), including deep learning programs, also collectively referred to as machine-learning algorithms or tools, are utilized to perform operations associated with correlating data or other artificial intelligence (AI)-based functions in connection with the computation model 830.

As illustrated in FIG. 9, deep learning program training 904 can be performed within the DLTA 818 based on training data 902 (which can include features, such as for example SLAs and KPIs as well as corresponding low-level feature controls such as resource controls). During the deep learning program training 904, features from the training data 902 can be assessed for purposes of further training of the DL program (or computation model). The DL program training 904 results in a trained DL program 906 which can include one or more classifiers 908 that can be used to provide assessments 910 (e.g., new feature controls) based on new data 912 (e.g., new SLAs and KPIs communicated to the PRM 802).

Deep learning is part of machine learning, which is a field of study that gives computers the ability to learn without being explicitly programmed. Machine learning explores the study and construction of algorithms, also referred to herein as tools, that may learn from existing data, correlate data, and make predictions about new data. Such machine learning tools operate by building a model from example training data (e.g., 902) in order to make data-driven predictions or decisions expressed as outputs or assessments 910. Although example embodiments are presented with respect to a few machine-learning tools (e.g., a deep learning training architecture), the principles presented herein may be applied to other machine learning tools.

In some example embodiments, different machine learning tools may be used. For example, Logistic Regression (LR), Naive-Bayes, Random Forest (RF), neural networks (NN), matrix factorization, and Support Vector Machines (SVM) tools may be used during the program training process 904 (e.g., for correlating the training data 902).

Two common types of problems in machine learning are classification problems and regression problems. Classification problems, also referred to as categorization problems, aim at classifying items into one of several category values (for example, is this object an apple or an orange?). Regression algorithms aim at quantifying some items (for example, by providing a value that is a real number). In some embodiments, the DLTA 818 can be configured to use machine learning algorithms that utilize the training data 902 to find correlations among identified features that affect the outcome.

The machine learning algorithms utilize features from the training data 902 for analyzing the new data 912 to generate the assessments 910. The features include individual measurable properties of a phenomenon being observed and used for training the ML program. The concept of a feature is related to that of an explanatory variable used in statistical techniques such as linear regression. Choosing informative, discriminating, and independent features are important for the effective operation of the MLP in pattern recognition, classification, and regression. Features may be of different types, such as numeric features, strings, and graphs. In some embodiments, the training data can be of different types, with the features being numeric for use by a computing device.

The machine learning algorithms utilize the training data 902 to find correlations among the identified features that affect the outcome of assessments 910. In some example embodiments, the training data 902 includes labeled data, which is known data for one or more identified features and one or more outcomes. With the training data 902 (which can include identified features), the DL program is trained using the DL program training 904 within the DLTA 818. The result of the training is the trained DL program (or computation model) 906. When the DL program 906 is used to perform an assessment, new data 912 is provided as an input to the trained DL program 906, and the DL program 906 generates the assessments 910 as an output.

FIG. 10 is a diagram 1000 illustrating generation of a trained DL program 1006 using a neural network model trained within the DLTA 818 of FIG. 8, according to an example. Referring to FIG. 10, source data 1002 (which can include training data) can be analyzed by a neural network model 1004 (or another type of a machine-learning algorithm or technique) to generate the trained DL program 1006 (which can be the same as the trained DL program 906 or the computation model 830). The source data 1002 can include a training set of data, such as one or more SLAs, KPIs, and corresponding feature controls such as low-level resource controls. As used herein, the terms "neural network" and "neural network model" are interchangeable.

Machine-learning techniques train models to accurately make predictions on data fed into the models (e.g., what was said by a user in a given utterance; whether a noun is a person, place, or thing; what the weather will be like tomorrow). During a learning phase, the models are developed against a training dataset of inputs to optimize the models to correctly predict the output for a given input. Generally, the learning phase may be supervised, semi-supervised, or unsupervised; indicating a decreasing level to which the "correct" outputs are provided in correspondence to the training inputs. In a supervised learning phase, all of the outputs are provided to the model and the model is directed to develop a general rule or algorithm that maps the input to the output. In contrast, in an unsupervised learning phase, the desired output is not provided for the inputs so that the model may develop its own rules to discover relationships within the training dataset. In a semi-supervised learning phase, an incompletely labeled training set is provided, with some of the outputs known and some unknown for the training dataset.

Models may be run against a training dataset for several epochs, in which the training dataset is repeatedly fed into the model to refine its results (i.e., the entire dataset is processed during an epoch). During an iteration, the model (e.g., a neural network model or another type of machine learning model) is run against a mini-batch (or a portion) of the entire dataset. In a supervised learning phase, a model is developed to predict the output for a given set of inputs (e.g., source data 1002) and is evaluated over several epochs to more reliably provide the output that is specified as corresponding to the given input for the greatest number of inputs for the training dataset. In another example, for an unsupervised learning phase, a model is developed to cluster the dataset into n groups and is evaluated over several epochs as to how consistently it places a given input into a given group and how reliably it produces the n desired clusters across each epoch.

Once an epoch is run, the models are evaluated, and the values of their variables (e.g., weights, biases, or other parameters) are adjusted to attempt to better refine the model in an iterative fashion. As used herein, the term "weights" is used to refer to the parameters used by a machine-learning model.

In various aspects, the evaluations are biased against false negatives, biased against false positives, or evenly biased with respect to the overall accuracy of the model. The values may be adjusted in several ways depending on the machine learning technique used. For example, in a genetic or evolutionary algorithm, the values for the models that are most successful in predicting the desired outputs are used to develop values for models to use during the subsequent epoch, which may include random variation/mutation to provide additional data points. One of ordinary skill in the art will be familiar with several other machine learning algorithms that may be applied with the present disclosure, including linear regression, random forests, decision tree learning, neural networks, deep neural networks, etc.

Each model develops a rule or algorithm over several epochs by varying the values of one or more variables affecting the inputs to more closely map to the desired result, but as the training dataset may be varied, and is preferably very large, perfect accuracy and precision may not be achievable. A number of epochs that make up a learning phase, therefore, may be set as a given number of trials or a fixed time/computing budget or may be terminated before that number/budget is reached when the accuracy of a given model is high enough or low enough or an accuracy plateau has been reached. For example, if the training phase is designed to run n epochs and produce a model with at least 95% accuracy, and such a model is produced before the nth epoch, the learning phase may end early and use the produced model satisfying the end-goal accuracy threshold. Similarly, if a given model is inaccurate enough to satisfy a random chance threshold (e.g., the model is only 55% accurate in determining true/false outputs for given inputs), the learning phase for that model may be terminated early, although other models in the learning phase may continue training. Similarly, when a given model continues to provide similar accuracy or vacillate in its results across multiple epochs—having reached a performance plateau—the learning phase for the given model may terminate before the epoch number/computing budget is reached.

Once the learning phase is complete, the models are finalized. In some example embodiments, models that are finalized are evaluated against testing criteria. In a first example, a testing dataset that includes known outputs for its inputs is fed into the finalized models to determine the accuracy of the model in handling data that has not been trained on. In a second example, a false positive rate or false-negative rate may be used to evaluate the models after finalization. In a third example, a delineation between data clusters in each model is used to select a model that produces the clearest bounds for its clusters of data.

In some example embodiments, the DL program 1006 is trained by a neural network 1004 (e.g., deep learning, deep convolutional, or recurrent neural network), which comprises a series of "neurons," such as Long Short Term Memory (LSTM) nodes, arranged into a network. A neuron is an architectural element used in data processing and artificial intelligence, particularly machine learning, that includes memory that may determine when to "remember" and when to "forget" values held in that memory based on the weights of inputs provided to the given neuron. Each of the neurons used herein is configured to accept a predefined number of inputs from other neurons in the network to provide relational and sub-relational outputs for the content of the frames being analyzed. Individual neurons may be chained together and/or organized into tree structures in various configurations of neural networks to provide interactions and relationship learning modeling for how each of the frames in an utterance is related to one another.

For example, an LSTM serving as a neuron includes several gates to handle input vectors (e.g., phonemes from an utterance), a memory cell, and an output vector (e.g., contextual representation). The input gate and output gate control the information flowing into and out of the memory cell, respectively, whereas forget gates optionally remove information from the memory cell based on the inputs from linked cells earlier in the neural network. Weights and bias vectors for the various gates are adjusted over the course of a training phase, and once the training phase is complete, those weights and biases are finalized for normal operation. One of skill in the art will appreciate that neurons and neural networks may be constructed programmatically (e.g., via software instructions) or via specialized hardware linking each neuron to form the neural network.

Neural networks utilize features for analyzing the data to generate assessments (e.g., recognize units of speech). A feature is an individual measurable property of a phenomenon being observed. The concept of the feature is related to that of an explanatory variable used in statistical techniques such as linear regression. Further, deep features represent the output of nodes in hidden layers of the deep neural network.

A neural network (e.g., 1004), sometimes referred to as an artificial neural network or a neural network model, is a computing system based on consideration of biological neural networks of animal brains. Such systems progressively improve performance, which is referred to as learning, to perform tasks, typically without task-specific programming. For example, in image recognition, a neural network may be taught to identify images that contain an object by analyzing example images that have been tagged with a name for the object and, having learned the object and name, may use the analytic results to identify the object in untagged images. A neural network is based on a collection of connected units called neurons, where each connection, called a synapse, between neurons, can transmit a unidirectional signal with an activating strength that varies with the strength of the connection. The receiving neuron can activate and propagate a signal to downstream neurons connected to it, typically based on whether the combined incoming signals, which are from potentially many transmitting neurons, are of sufficient strength, where strength is a parameter.

A deep neural network (DNN) is a stacked neural network, which is composed of multiple layers. The layers are composed of nodes, which are locations where computation occurs, loosely patterned on a neuron in the human brain, which fires when it encounters sufficient stimuli. A node combines input from the data with a set of coefficients, or weights, that either amplify or dampen that input, which assigns significance to inputs for the task the algorithm is trying to learn. These input-weight products are summed, and the sum is passed through what is called a node's activation function, to determine whether and to what extent that signal progresses further through the network to affect the ultimate outcome. A DNN uses a cascade of many layers of non-linear processing units for feature extraction and transformation. Each successive layer uses the output from the previous layer as input. Higher-level features are derived from lower-level features to form a hierarchical representation. The layers following the input layer may be convolution layers that produce feature maps that are filtering results of the inputs and are used by the next convolution layer.

In training of a DNN architecture, a regression, which is structured as a set of statistical processes for estimating the relationships among variables, can include minimization of a cost function. The cost function may be implemented as a function to return a number representing how well the neural network performed in mapping training examples to correct output. In training, if the cost function value is not within a predetermined range, based on the known training images, backpropagation is used, where backpropagation is a common method of training artificial neural networks that are used with an optimization method such as stochastic gradient descent (SGD) method.

The use of backpropagation can include propagation and weight update. When an input is presented to the neural network, it is propagated forward through the neural network, layer by layer, until it reaches the output layer. The output of the neural network is then compared to the desired output, using the cost function, and an error value is calculated for each of the nodes in the output layer. The error values are propagated backward, starting from the output, until each node has an associated error value which roughly represents its contribution to the original output. Backpropagation can use these error values to calculate the gradient of the cost function with respect to the weights in the neural network. The calculated gradient is fed to the selected optimization method to update the weights to attempt to minimize the cost function.

Even though the training architecture 818 is referred to as a deep learning training architecture using a neural network model (and the program that is trained is referred to as a computation model or a trained deep learning program, such as 906 and 1006), the disclosure is not limited in this regard and other types of machine-learning training architectures may also be used for model training.

Figure 11:
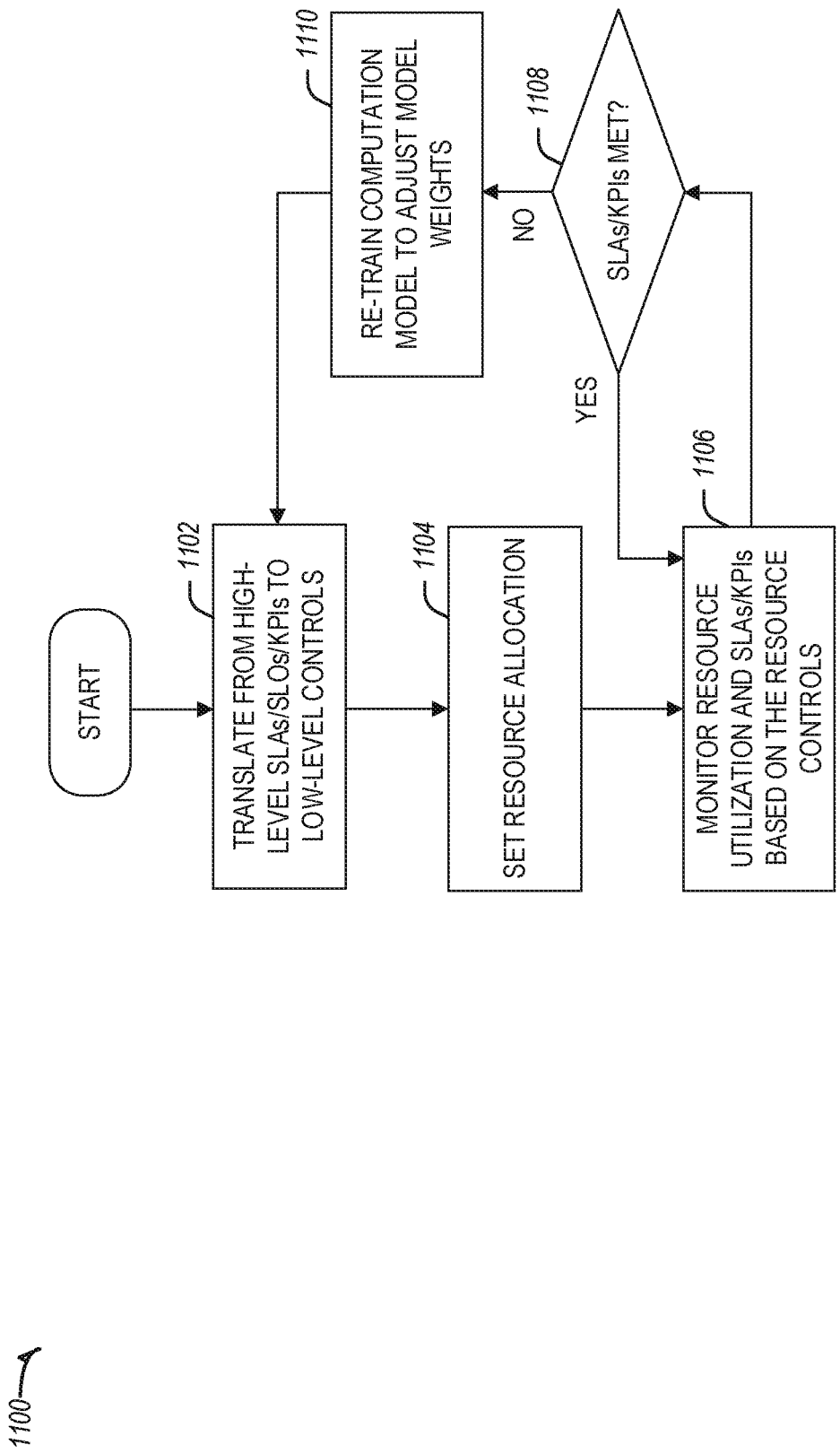
FIG. 11 illustrates a flowchart of an example process for re-training a computation model used by a PRM, according to an example.

FIG. 11 illustrates a flowchart of an example method 1100 for re-training a computation model used by a PRM, according to an example. Referring to FIG. 11, the method 1100 can include operations 1102, 1104, 1106, 1108, and 1110, which can be performed by processing circuitry of an edge computing device using a PRM, such as the PRM 802. At operation 1102, the PRM 802 receives one or more SLAs 822 that include KPIs associated with, for instance, an edge service. For example, one or more SLAs 822 specify KPIs for a number of errors in HTTP traffic of an edge service to a client device. The PRM 802 translates the SLAs to a plurality of feature controls for the KPIs, including CPU saturation/utilization, CPU cache, memory traffic bandwidth (measured using, e.g., resource director technology or memory bandwidth monitoring to provide approximate and indirect per core control over memory bandwidth), packet latency to proxy servers, cache misses, cache references, number of CPU instances, and amount of memory. At operation 1104, the PRM 802 allocates resources of the edge computing nodes and sets the determined feature controls associated with the received SLAs. At operation 1106, PRM 802 monitors resource utilization and SLA compliance based on the set feature controls. At operation 1108, PRM 802 determines whether the KPIs of the one or more SLAs 822 are met based on the feature utilization information 828. If the KPIs are met, monitoring resumes at operation 1106. If the KPIs are not met, at operation 1110, the computation model 830 is retrained using the DLTA 818 as well as updated weights based on the feature utilization information 828.

In some aspects, the PRM 802 detects a deviation in at least one of the feature controls during usage of the platform resources and determines a resource improvement rate based on the detected deviation. The DLTA 818 can retrain and update the weights of the computation model 830 based on the determined resource improvement rate.

In an example embodiment, the PRM 802 exposes to application developers a new interface 810 for specifying high-level SLAs in the form of key performance indicators (KPIs), such as response time, latency, jitter, throughput, etc. These can be specified at the granularity of individual processes or containers. Interface 810 may be standard across a broad set of consumers or may be a common framework within which equivalent interfaces can be exercised for working across different solution providers.

In some embodiments, interface 810 can be configured for publishing and receiving computation models (e.g., computation model 830), which control the mapping/translating functions 816 between the high-level SLAs/KPIs and the low-level controls/knobs available on the edge platform. The computation models may be implemented in a variety of ways, including machine-learning algorithms, deep learning algorithms, statistical methods, decision trees, etc. The internals of these models and model implementation are unconstrained by the interface.

In some embodiments, the underlying platform resources 808 may include the following: (a) hardware resources such as processor cycles, accelerator fractions and times, cache capacities, memory, storage, and network bandwidths, and so on; (b) software resources or software managed resources such as memory capacity limits, process scheduling priorities, priorities or usage durations over-controlled or licensed software, priorities over coordination resources like locks, event queues, and so on; (c) miscellaneous other environmental resources such as power-draw limits, energy use limits, thermal budgets, and so on; and (d) virtual or indirect resources, and proxy resources, such as credits, tokens, attestations, to be applied or used for allocating and scheduling one or more types of resources (hardware resources, software resources, miscellaneous environmental resources) as enumerated above. The virtual or indirect or proxy resources may also include pools of above resources, including pools of virtual or indirect or proxy resources, thus allowing for a flexible delegation from a PRM to other PRMs, including proxy PRMs (or nested PRMs), as described herein.

In some embodiments, the PRM 802 monitors the use of the underlying platform resources 808 and takes various direct or indirect measures (e.g., as mentioned in connection with FIG. 11) over the compliance requirements associated with the KPIs. The PRM 802, when the above mentioned KPIs are failing to be complied with, identifies the likely causes, in terms of resource types and quantities, that are in inadequate quantities and therefore the quantity adjustments that may be suitable, identifies the desired improvement rate (e.g., 0≤improvement rate≤1.0). When the above mentioned KPIs are failing to be complied with (e.g., as detected at operation 1108 in FIG. 11), the PRM 802 may further adjust the mapping/translation (functions 816) of the KPIs into the feature controls to ensure that the likely causes resulting in SLA non-compliance are addressed (e.g., brought in line with desirable assignments) over desirable durations by achieving the quantity adjustments at the identified improvement rate.

In some embodiments, the PRM 802 exposes the ability to receive and grant nested PRM capabilities (e.g., as illustrated in connection with FIGS. 13A-13B). The nested PRM capability may be requested by a software or a hardware component that can emulate the behavior of a PRM. When the PRM 802 grants to such a component a nested PRM capability, it permits that component to perform its own monitoring and compliance adjustments at a fine-grained level over the resources, KPIs, and knobs that are part of the nested PRM capability. As a result and as an example, a PRM 802 operating at a full machine-level may grant to a virtual machine a resource allocation and the ability to create its own nested PRM that receives the ownership over the received resource allocation. The nested PRM applies over the KPIs that must be met by the nested PRM (e.g., to obtain and subdivide a certain fraction of storage bandwidth among the applications that are contained in such a virtual machine) and performs monitoring of the low-level controls and adjustment of resource allocations using the resources allocated by PRM 802.

In some embodiments, the granting PRM (e.g., parent PRM) gives to the grantee PRM (or nested PRM or child PRM), the security controls over the tasks/functions/services that occur in the grantee PRM's execution container (such as a guest VM). This permits the flexible movement of security control to the grantee PRM.

In some embodiments, PRM 802, whether at a platform level (e.g., a parent PRM) or as a nested PRM, may use various rules, policies, models, algorithms, decision procedures, etc., to achieve the identifications of the likely causes of SLA non-compliance (e.g., resource types and quantities) as described above. The computation model 830 may include classical ML algorithms such as linear or multilinear regression models, model trees, support vector machines, etc., and, models may include trained deep learning, Bayesian, probabilistic graph models, gaussian mixture models, reinforcement learning, and so on, and may include various combinations of such models. In some embodiments, PRM 802 may implement various default algorithms/models, or it may be provided with the algorithms/models/policies through an industry-standard interface.

In some embodiments, the edge platform using the PRM 802 may include dynamically offload-able or on-loadable resources, such as hot-plug PCI-e devices, hot-pluggable memory or accelerator modules, etc., and can be configured to generate OS/VMM events when such devices are added or removed from the edge platform. In this regard, the drivers of such devices may use the sideband API (e.g., in connection with interface 812) to inform the PRM 802 about the addition or removal of the resources represented by these events, and the resulting change in platform resources 808. In some embodiments, upon detecting such dynamic change in platform resources 808, PRM 802 may perform the mapping/translation functions 816 again to recompute the feature controls 826 and make any resulting changes in resource allocation or low-level controls resulting from the dynamic change in platform resources. In some embodiments, the computation model 830 may be retrained based on the updated platform resources and a new set of feature controls 826 can be determined by translating the one or more SLAs 822 using the updated computation model 830.

Figure 12:
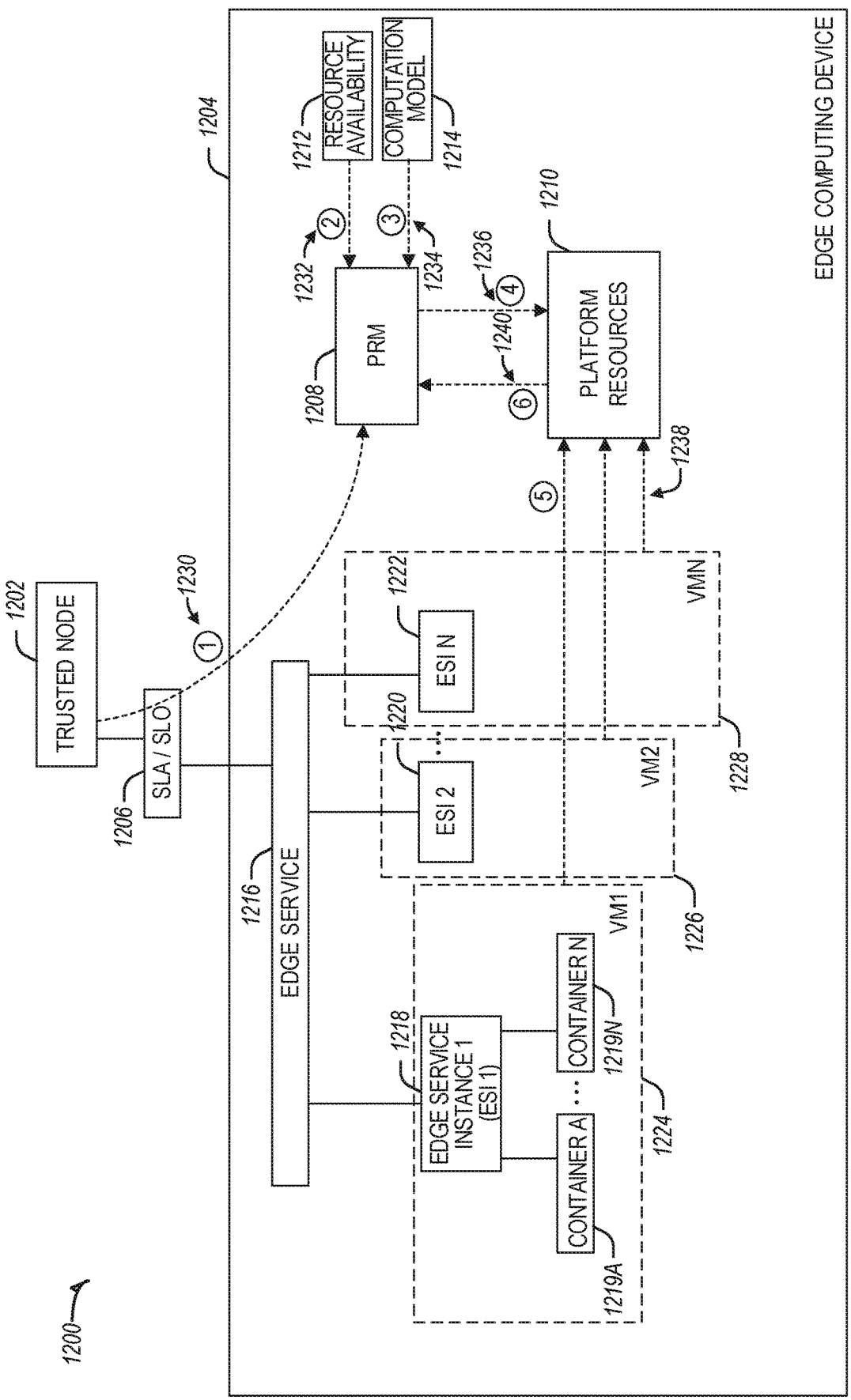
FIG. 12 illustrates a block diagram of an edge computing device using a PRM to manage resources based on a service level agreement associated with an edge service, according to an example.

FIG. 12 illustrates a block diagram 1200 of an edge computing device 1204 using a PRM 1208 to manage resources based on a service level agreement associated with an edge service, according to an example. Referring to FIG. 12, the edge computing device 1204 includes a PRM 1208 and one or more VMs (e.g., 1224, 1226, . . . , 1228) executing on platform resources 1210. For example, the edge computing device 1204 can provide edge service 1216 which can be implemented using one or more edge service instances that are instantiated on virtual machines running on the platform resources 1210.

As illustrated in FIG. 12, edge service 1216 includes one or more edge service instances (ESIs) such as ESIs 1218, 1220, . . . , 1222. Each ESI can be implemented by a plurality of containers executing on one or more VMs. For example, ESI 1218 includes containers 1219A, . . . , 1219N executing on VM 1224. In another embodiment, edge service 1216 includes ESIs 1218, . . . , 1220 executing on VMs 1224 and 1226. In yet another embodiment, edge service 1216 includes ESIs 1218, 1220, . . . , 1222 executing on VMs 112, 1226, . . . , 1228.

In operation, PRM 1208 receives SLO (or SLA) 1206 from the trusted node 1202 (e.g., an orchestrator node, a master node, or another trusted node) at operation 1230. PRM 1208 receives resource availability 1212 at operation 1232, and computation model 1214 at operation 1234. In some embodiments, SLO 1206 includes KPIs associated with the edge service 1216 (e.g., KPIs associated with each service instance of the edge service 1216 executing on VMs within the edge computing device 1204). After the PRM 1208 receives the SLO 1206 (defining usage of accessible features of the edge computing device), the resource availability 1212, and computation model 1214, the PRM 1208 can perform mapping/translation of the KPIs within the SLO 1206 to obtain feature controls associated with platform resources 1210 of the edge computing device 1204. At operation 1236, the PRM 1208 sets the determined feature controls on the platform resources 1210 used for running VMs with edge service instances of the edge service 1216. At operation 1238, feature utilization information associated with the set feature controls is received from VMs 1224, . . . , 1228 and is reported back to PRM 1208 at operation 1240. The PRM 1208 can determine whether the execution of the edge service 1216 results in compliance with the SLO 1206 based on the received feature utilization from VMs 1224, . . . , 1228. The PRM 1208 can perform one or more remedial actions if noncompliance with the SLO 1206 is determined based on the feature utilization (e.g., reallocation of resources to the VMs that host edge service instances of the edge service 1216, retraining of the computation model 1214, adjusting resource allocations, and so forth).

Figure 13A:
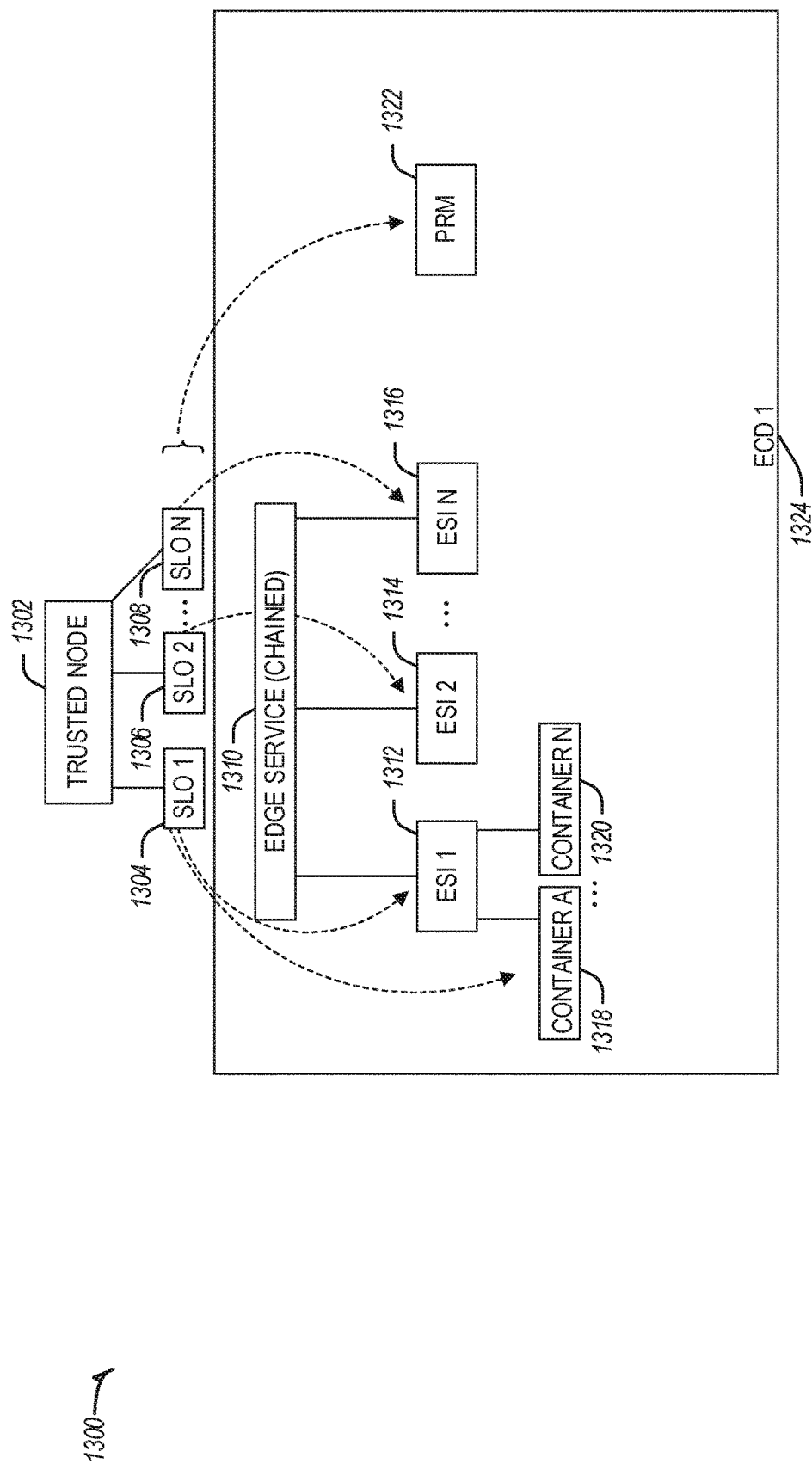
FIG. 13A and FIG. 13B illustrate block diagrams of edge computing devices configured to use nested PRMs to manage resources based on service level agreements associated with a chained edge service, according to an example.
Figure 13B:
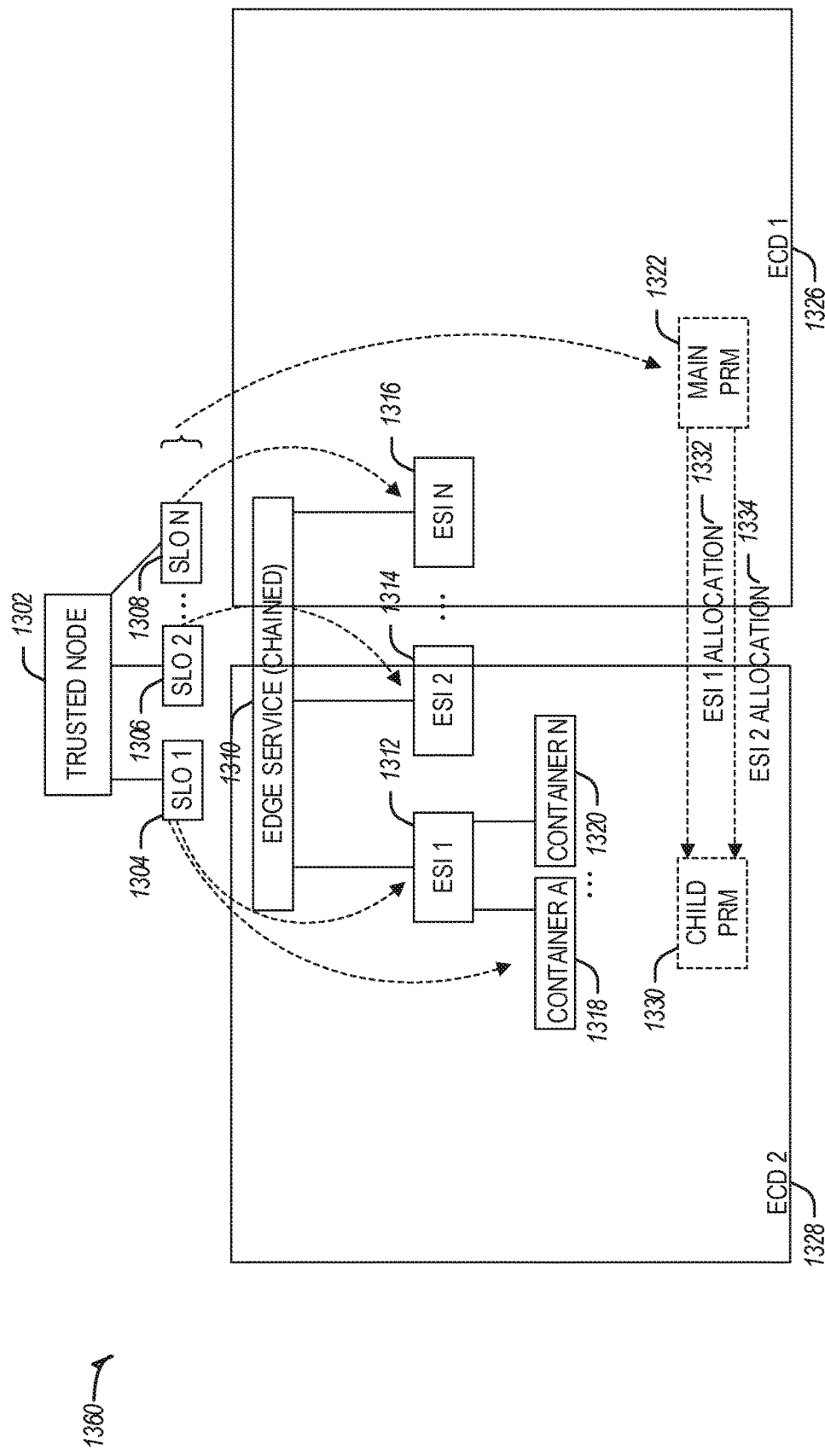

FIG. 13A and FIG. 13B illustrate block diagrams of edge computing devices configured to use nested PRMs to manage resources based on service level agreements associated with a chained edge service, according to an example. Referring to FIG. 13A, there is illustrated an edge service 1310 which can be executing on one or more edge computing devices, such as edge computing device 1324. The edge service 1310 can be implemented via one or more edge service instances (ESI), such as ESIs 1312, 1314, . . . , 1316. Each ESI can include a plurality of containers instantiated on a virtual machine of an edge computing device. For example, ESI 1312 includes containers 1318, . . . , 1320 instantiated on a virtual machine of the edge computing device 1324. FIG. 13A and FIG. 13B illustrate processing scenarios with a different number of edge computing devices associated with the edge service 1310.

In an example embodiment and in connection with the processing scenario of FIG. 13A, a single edge computing device 1324 may host one or more virtual machines associated with ESIs 1312, . . . , 1316 of the edge service 1310. A trusted node 1302, which can include an orchestrator node, a master node, or another type of trusted node, communicates multiple SLOs (or SLAs) 1304, 1306, . . . , 1308 to the PRM 1322 in the edge computing device 1324. SLO 1304 can be associated with ESI 1312 or one or more of the containers 1318, . . . , 1320 of ESI 1312. Similarly, SLO 1306 can be associated with ESI 1314 (and/or one or more of the containers of ESI 1314), and SLO 1308 can be associated with ESI 1316 (and/or one or more of the containers of ESI 1316). In this case, when multiple SLOs associated with different edge service instances are communicated by the trusted node 1302, the edge service 1310 can be referred to as a chained edge service. PRM 1322 can process (e.g., map/translate) each SLO as discussed previously (e.g., in connection with FIG. 8 in FIG. 12).

FIG. 13B illustrates a block diagram of edge computing devices 1326 and 1328 using nested PRMs to manage resources based on service level agreements associated with a chained edge service, according to an example. In an example embodiment and in connection with processing scenario 1360 of FIG. 13B, PRM 1322 and ESI 1316 may be located on edge computing device 1326, and ESIs 1312, . . . , 1314 may be executing on virtual machines on edge computing device 1328. In some aspects, PRM 1322 can be referred to as a main (or parent) PRM which can be configured to perform nested PRM functionalities. More specifically, the main PRM 1322 can use SLOs 1304 and 1306 to determine resource allocations 1332 and 1334 for ESI 1312 and ESI 1314, respectively. The main PRM 1322 can instantiate (or otherwise cause deployment of) a child PRM 1330 at the edge computing device 1328. The main PRM 1322 can then communicate the resource allocations 1332 and 1334 to the child PRM 1330, and the child PRM 1330 performs selling of the feature controls and monitoring of feature utilization to ensure compliance with SLOs 1304 and 1306 for ESIs 1312 and 1314.

Figure 14A:
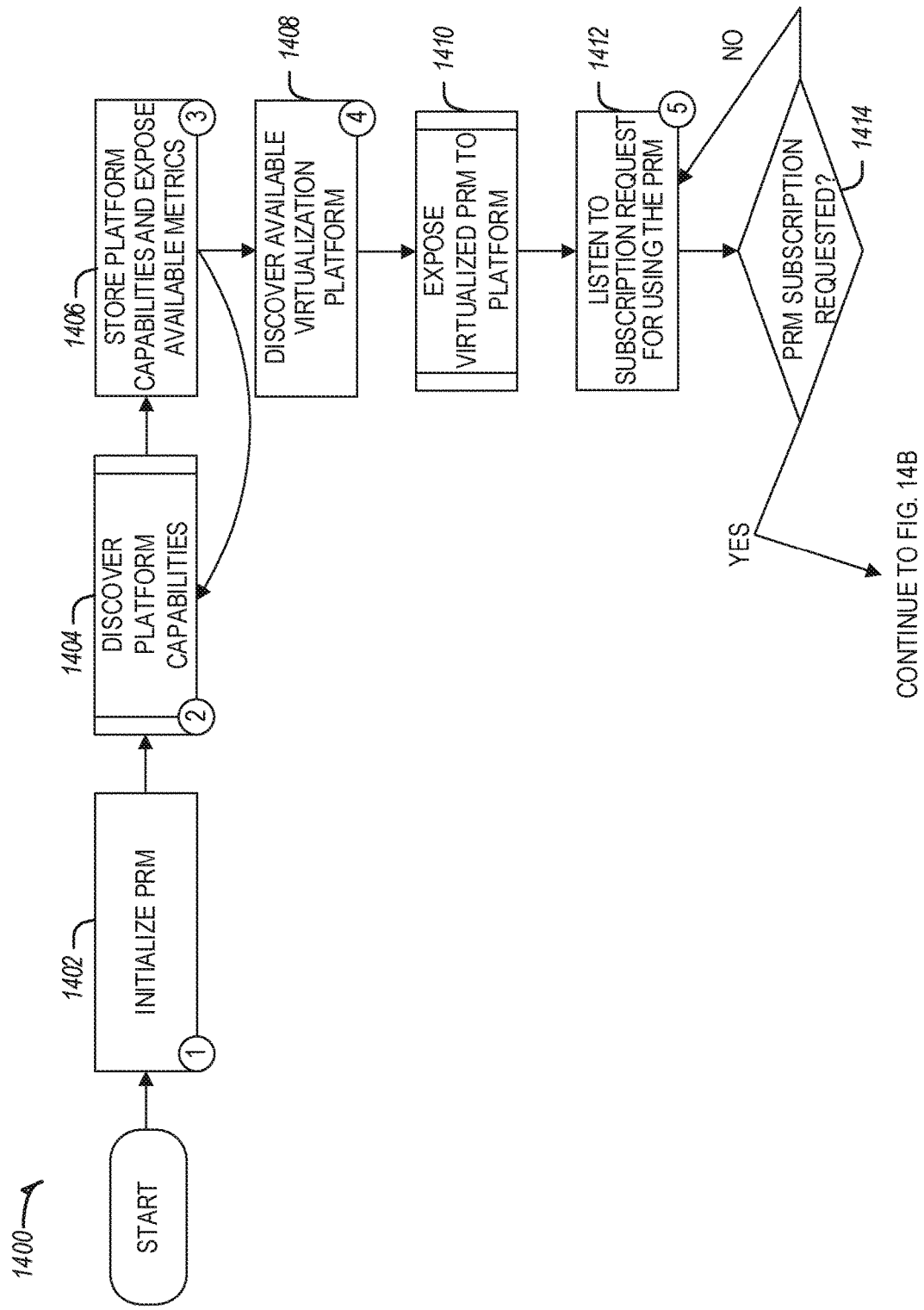
FIG. 14A, FIG. 14B, and FIG. 14C illustrate a flowchart of an example process for establishing and using a PRM, according to an example.
Figure 14B:
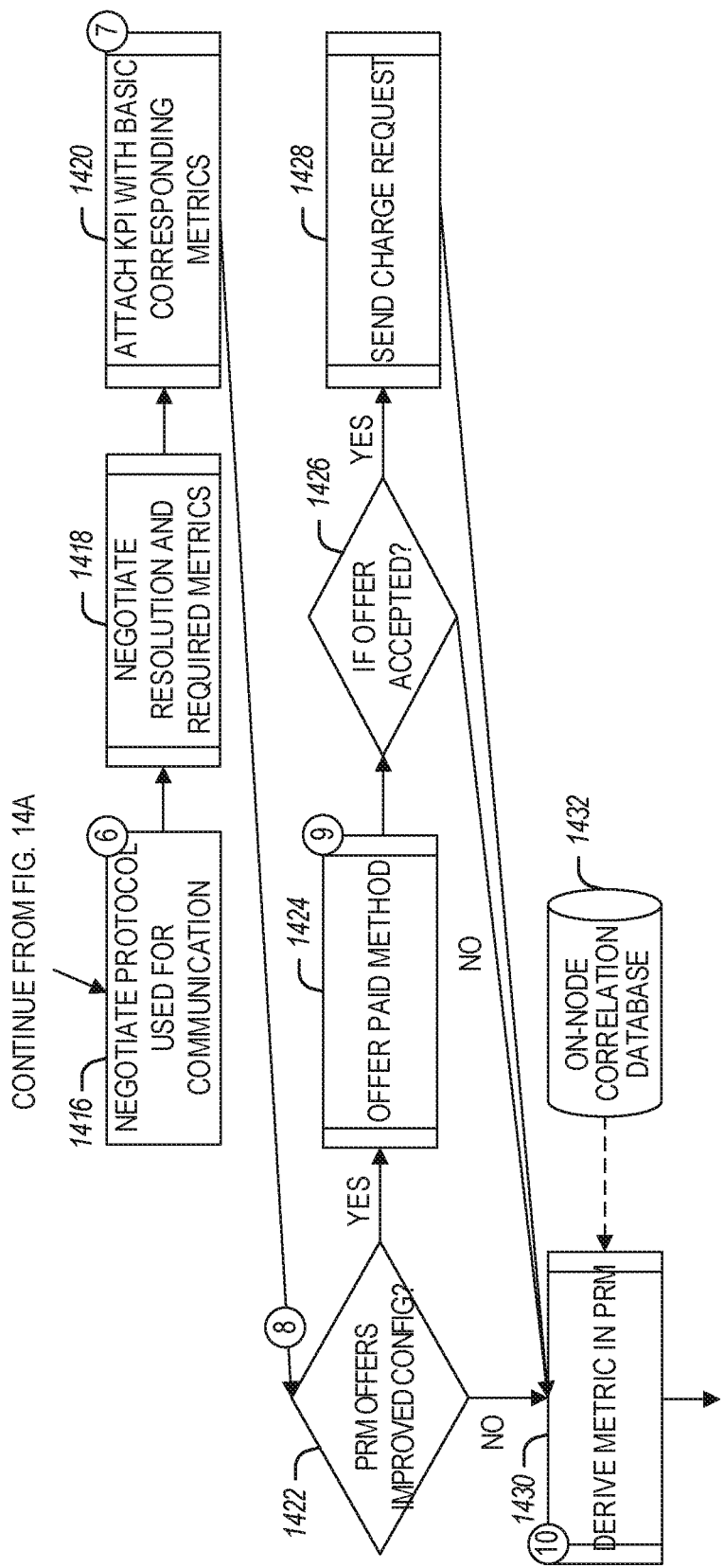
Figure 14C:
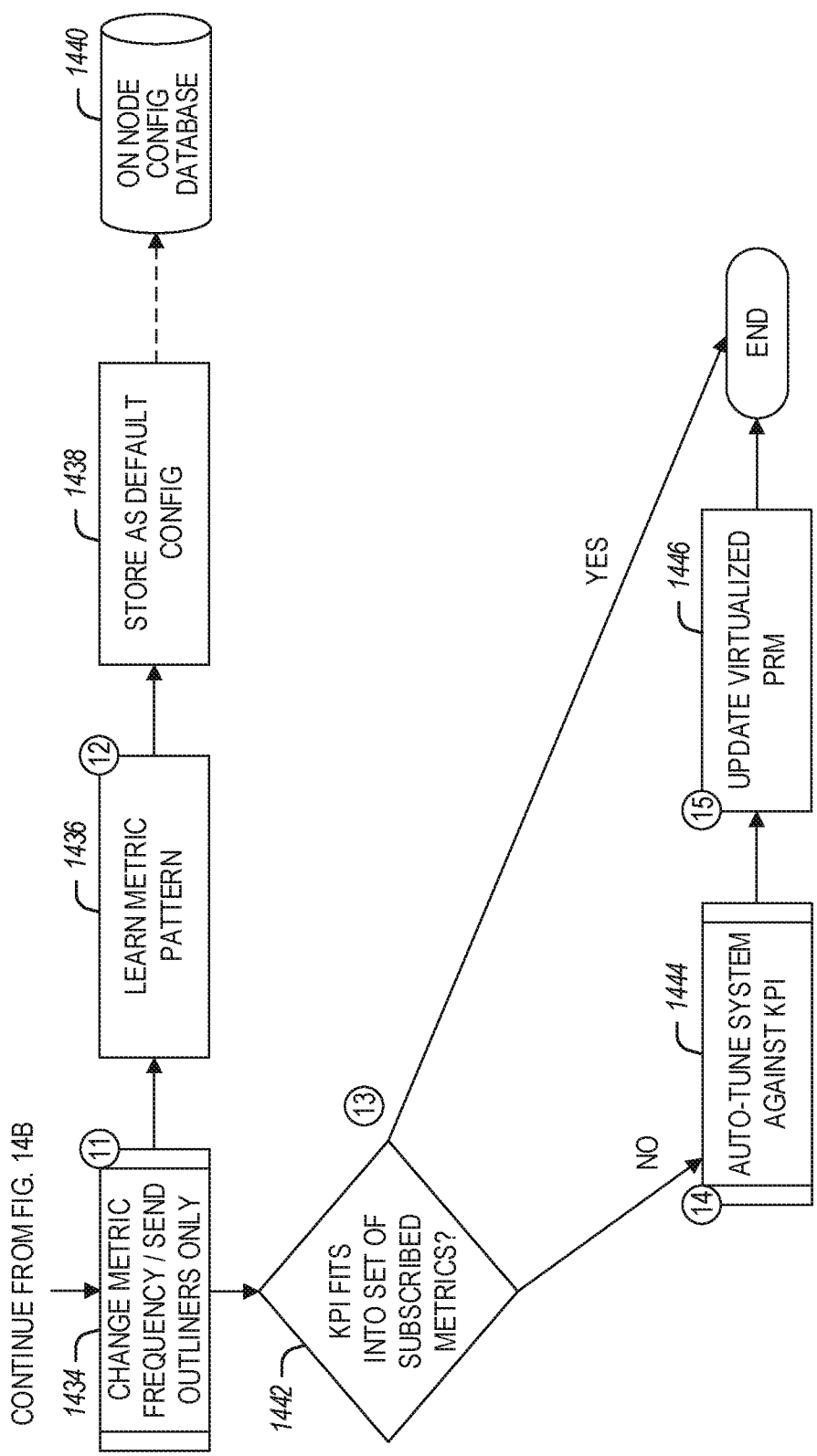

FIG. 14A, FIG. 14B, and FIG. 14C illustrate a flowchart of an example process 1400 for establishing and using a PRM, according to an example. The example steps/operations FIGS. 14A-14C can be performed by a processor of an edge computing device that includes a PRM (e.g., 802). At operation 1402, a PRM may be initialized and loaded into memory, awaiting a request for PRM functions and exposing one or more APIs associated with the PRM. At operation 1404, PRM 802 discovers platform capabilities and system resources, loadable hot-plug PCI-e devices that can expose telemetry, and, buses that can be used to configure QoS capabilities. At operation 1406, the PRM 1802 stores available metrics and capabilities, and exposes the stored metrics and capabilities to the operating system (e.g., platform software 806) through an API. Without loss of generality, the term operating system inclusively refers to hypervisors, guest OSes, runtimes, and generally, the application-hosting environment or other types of platform software environments.

At operation 1408, the platform resource manager software is initialized on the operating system of the edge computing device and discovers available virtualization platform to expose available metrics and offer a virtualized entity of the PRM (at operation 1410) (e.g., as a service to users of the edge computing device). At operation 1412, PRM 802 is set to listening mode awaiting PRM subscription requests as well as to discover the availability of new virtual machines, containers, etc. executing on the edge computing device. At operation 1404, it can be determined whether a PRM subscription/usage is requested. If such subscription/usage is requested, processing continues to operation 1416 in FIG. 14B.

Referring to FIG. 14B, at operation 1416, if a request for PRM services is detected, the PRM negotiates a protocol that can be used for communication in connection with PRM functions. When a connection is established (e.g., with a requesting entity), a virtualized entity of the platform manager negotiates, at operation 1418, an application set of metrics that are subscribed to as well as the metrics resolution. This information may be stored in an on-the-node database.

At operation 1420, a QoS and KPIs are negotiated/determined, and a resource configuration is formulated; and then, a metric that corresponds to them (the determined target QoS, KPI) is derived. The formulated/derived information (e.g., the negotiated QoS, KPI, resource configuration, and the derived metric) are saved to a database at the node so that it can be reused if a similar workload is deployed.

At operation 1422, it can be determined whether a better deployment configuration is available. If available, the benefits of that configuration, as well as the price, are shown to the user. At operation 1424, the PRM 802 may offer a paid subscription (or one-time use) of the PRM functions. If the offer is accepted, at operation 1426, a payment request is communicated at operation 1428. At operation 1430, either the metrics that can be monitored for the KPIs or derivative (proxy) metrics for the KPIs (e.g., latency, utilization, etc.), are identified. These metrics may be loaded from the on-node correlation database 1432. Processing may then continue to FIG. 14C.

Referring to FIG. 14C, at operation 1434, the virtualized PRM monitors metrics and internal mechanisms (e.g., based on anomaly detection) and detects whether the monitored data is static (i.e., smoothly varying) or noisy. If the data is relatively static, only changes are monitored to preserve available space and recover unused processor cycles. At operations 1436 and 1438, learned patterns and data anomalies are stored in on-node database 1440 as the default configuration. At operation 1442, the PRM determines whether the measured KPI fits into the set of subscribed metrics. If the KPI fits into the set of subscribed metrics, monitoring may continue. If the KPI does not fit into the set of subscribed metrics (e.g., the metrics being monitored show that the KPI is not being met), then an auto-tune system function may be used at operation 1444 to identify a configuration that fulfills the desired KPI, and the determined configuration may be applied. At operation 1446, the virtualized platform resource manager is updated with the new configuration.

Figure 15:
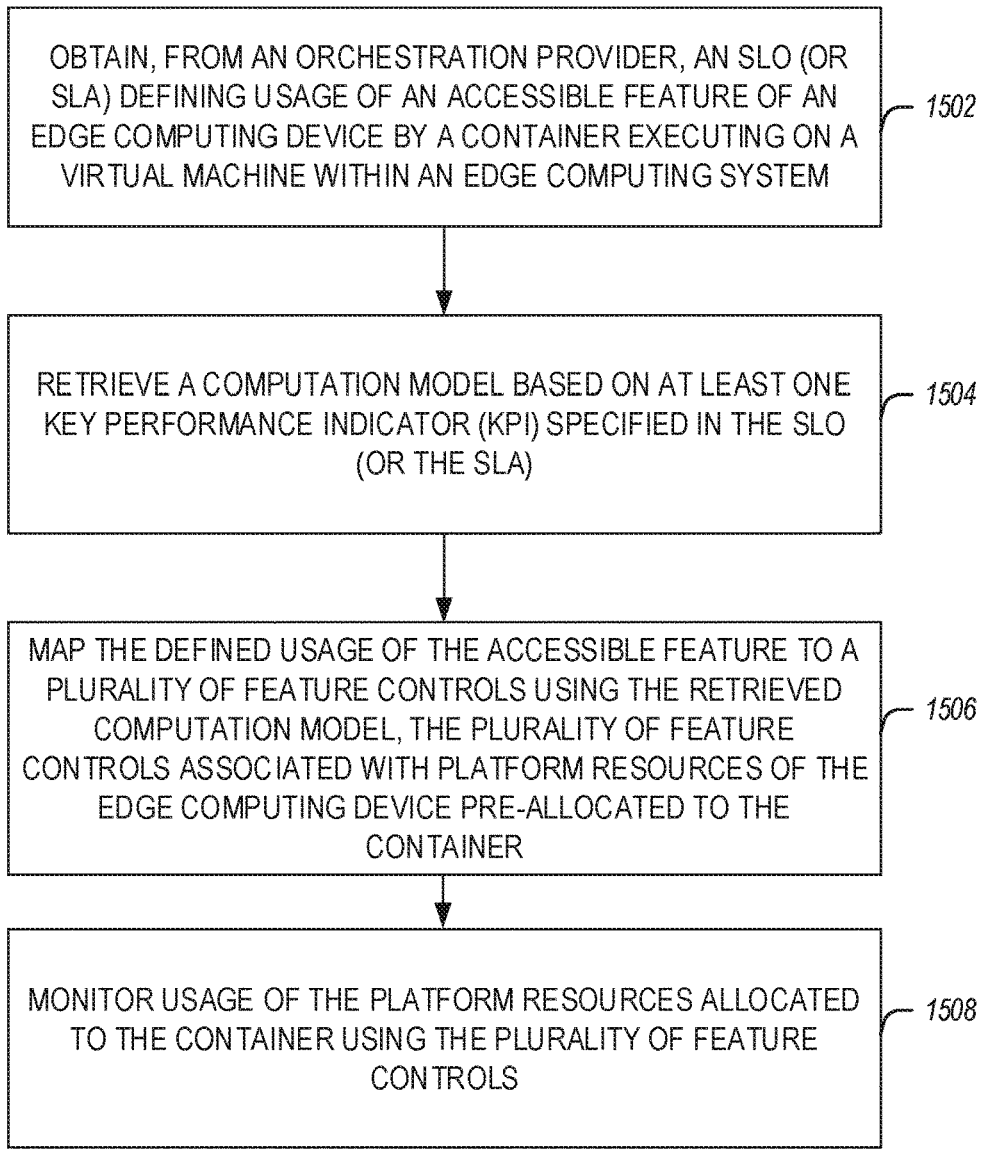
FIG. 15 illustrates a flowchart of an example process for managing resources of an edge computing device, according to an example.

FIG. 15 illustrates a flowchart of an example method 1500 for managing resources of an edge computing device, according to an example. The example method 1500 includes operations 1502, 1504, 1506, and 1508 which can be performed by the PRM 802 of FIG. 8.

At operation 1502, an SLO (or SLA) (e.g., 822) is obtained from an orchestration provider (e.g., orchestrator node 804). The SLO defines the usage of an accessible feature of the edge computing device by a container executing on a virtual machine within an edge computing system. For example, SLO 822 device KPIs associated with container 1219A of edge service instance 1218 (illustrated in FIG. 12). At operation 1504, a computation model is retrieved based on at least one KPI specified in the SLO. For example, PRM 802 retrieves computation model 830 trained by DLTA 818 based on KPIs within the received SLO 822. At operation 1506, the defined usage of the accessible feature is mapped to a plurality of feature controls using the retrieved computation model. For example, PRM 802 performs mapping/translation functions 816 using the computation model 830 to generate feature controls 826. The plurality of feature controls 826 is associated with platform resources of the edge computing device pre-allocated to the container. At operation 1508, usage of the platform resources allocated to the container is monitored using the plurality of feature controls. For example, after the feature controls 826 are set on the platform resources 808, the PRM 802 retrieves the feature utilization information 828 based on the set feature controls 826 to ensure compliance with the SLA 822. If a deviation from the SLO is detected, the PRM 802 can perform one or more remedial actions, such as retraining the computation model 830, adjusting the feature controls 826, adjusting the resource allocations of the platform resources 808, and so forth.

Even though techniques discussed herein are associated with a container executing on a virtual machine, the disclosure is not limited in this regard and the discussed techniques also apply to any process, container, VM, or another processing context.

Implementation of the preceding techniques may be accomplished through any number of specifications, configurations, or example deployments of hardware and software. It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field-programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center), than that in which the code is deployed (e.g., in a computer embedded in a sensor or robot). Similarly, operational data may be identified and illustrated herein within components or modules and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions.

ADDITIONAL NOTES & EXAMPLES

Additional examples of the presently described method, system, and device embodiments include the following, non-limiting configurations. Each of the non-limiting examples may stand on its own or may be combined in any permutation or combination with any one or more of the other examples provided below or throughout the present disclosure.

Example 1 is an edge computing device in an edge computing system, comprising: processing circuitry; and a memory device comprising instructions stored thereon, wherein the instructions, when executed by the processing circuitry, configure the processing circuitry to perform operations to obtain, from an orchestration provider, an SLO (or SLA), the SLO (or SLA) defining usage of an accessible feature of the edge computing device by a container executing on a virtual machine within the edge computing system; retrieve a computation model based on at least one key performance indicator (KPI) specified in the SLO (or SLA); map the defined usage of the accessible feature to a plurality of feature controls using the retrieved computation model, the plurality of feature controls associated with platform resources of the edge computing device pre-allocated to the container; and monitor usage of the platform resources allocated to the container using the plurality of feature controls.

In Example 2, the subject matter of Example 1 includes, subject matter where the feature controls include low-level controls set on at least one of the platform resources.

In Example 3, the subject matter of Examples 1-2 includes, where the container is an application container associated with an application executing within the edge computing system.

In Example 4, the subject matter of Example 3 includes, where the application container is executing on the virtual machine to provide a service to a client of the edge computing system.

In Example 5, the subject matter of Examples 1-4 includes, where the SLA defines usage of the accessible feature of the edge computing device by the virtual machine or by a fixed-purpose image within the edge computing system.

In Example 6, the subject matter of Examples 1-5 includes, where the virtual machine is hosted by the edge computing device, and wherein the instructions further configure the processing circuitry to perform operations to: detect a deviation in at least one of the plurality of feature controls during the usage of the platform resources pre-allocated to the container.

In Example 7, the subject matter of Example 6 includes, where the instructions further configure the processing circuitry to perform operations to: determine a resource improvement rate based on the detected deviation.

In Example 8, the subject matter of Example 7 includes, where the instructions further configure the processing circuitry to perform operations to: adjust mapping of the defined usage of the accessible feature to the plurality of resource controls based on the resource improvement rate.

In Example 9, the subject matter of Examples 7-8 includes, where the instructions further configure the processing circuitry to perform operations to: adjust allocation of the platform resources to the container based on the resource improvement rate.

In Example 10, the subject matter of Examples 7-9 includes, where the computation model is a machine learning model, and wherein the instructions further configure the processing circuitry to perform operations to: adjust at least one weight of the machine learning model based on the resource improvement rate.

In Example 11, the subject matter of Examples 1-10 includes, where the SLO (or SLA) further defines usage of the accessible feature by a virtual service, and the instructions further configure the processing circuitry to perform operations to: allocate a subset of the platform resources of the edge computing device to the container; and allocate at least a second subset of the platform resources of the edge computing device to an edge service instance instantiated as the virtual service on a second virtual machine in the edge computing system.

In Example 12, the subject matter of Example 11 includes, where the edge service instance includes a network function virtualization (NFV) instance instantiated as part of the virtual service.

In Example 13, the subject matter of Examples 11-12 includes, where the edge service instance is an edge service chain including multiple network function virtualization (NFV) instances instantiated as part of the virtual service.

In Example 14, the subject matter of Examples 11-13 includes, where the instructions further configure the processing circuitry to perform operations to: map the defined usage of the accessible feature by the virtual service to a second plurality of feature controls using the retrieved computation model, the second plurality of feature controls associated with the at least second subset of the platform resources of the edge computing device allocated to the edge service instance; and monitor usage of the at least second subset of the platform resources allocated to the edge service instance to detect a deviation from the second plurality of feature controls.

In Example 15, the subject matter of Examples 11-14 includes, where the second virtual machine used for instantiating the edge service instance is at the edge computing device, and wherein the instructions further configure the processing circuitry to perform operations to: instantiate a platform resource management service on the second virtual machine, the platform resource management service configured to manage allocations of the second subset of the platform resources among containers or virtual services executing on the second virtual machine.

In Example 16, the subject matter of Examples 1-15 includes, where the instructions further configure the processing circuitry to perform operations to: receive, from a platform software of the edge computing device, availability information for the platform resources of the edge computing device; and allocate the platform resources of the edge computing device to the application container based on the availability information.

In Example 17, the subject matter of Example 16 includes, where the instructions further configure the processing circuitry to perform operations to: receive a resource availability update via a sideband application programming interface (API) of the edge computing device, the resource availability update indicating addition or removal of dynamically off-loadable/on-loadable platform resources of the edge computing device.

In Example 18, the subject matter of Example 17 includes, where the instructions further configure the processing circuitry to perform operations to: re-map the defined usage of the accessible feature to a second plurality of resource controls using the retrieved computation model and further based on the resource availability update; and monitor usage of the platform resources allocated to the application container using the second plurality of resource controls.

In Example 19, the subject matter of Examples 1-18 includes, where the feature is a hardware resource or a service of the edge computing device, that is accessible by a client device according to characteristics of the feature.

In Example 20, the subject matter of Examples 1-19 includes, where the edge computing system is a Mobile Access Edge Computing (MEC) system operating according to a MEC specification, wherein the edge computing device is a MEC host, and wherein the feature is a MEC resource accessible within the MEC host.

In Example 21, the subject matter of Examples 1-20 includes, a storage device, where the SLO (or SLA) is stored locally at the edge computing device using the storage device.

Example 22 is at least one non-transitory machine-readable storage medium comprising instructions or stored data which may be configured into instructions, wherein the instructions, when configured and executed by a processing circuitry of an edge computing device operable in an edge computing system, cause the processing circuitry to perform operations that: obtain, from an orchestration provider, at least one of a Service Level Agreement (SLA) and a Service Level Objective (SLO), the SLA and SLO defining usage of an accessible feature of the edge computing device by a container executing on a virtual machine within the edge computing system; retrieve a computation model based on at least one key performance indicator (KPI) specified in at least one of the SLA and the SLO; map the defined usage of the accessible feature to a plurality of feature controls using the retrieved computation model, the plurality of feature controls associated with platform resources of the edge computing device pre-allocated to the container; and monitor usage of the platform resources allocated to the container using the plurality of feature controls.

In Example 23, the subject matter of Example 22 includes, subject matter where the feature controls include low-level controls set on at least one of the platform resources.

In Example 24, the subject matter of Examples 22-23 includes, where the container is an application container associated with an application executing within the edge computing system.

In Example 25, the subject matter of Example 24 includes, where the application container is executing on the virtual machine to provide a service to a client of the edge computing system.

In Example 26, the subject matter of Examples 22-25 includes, where at least one of the SLA and the SLO defines usage of the accessible feature of the edge computing device by the virtual machine or by a fixed-purpose image within the edge computing system.

In Example 27, the subject matter of Examples 22-26 includes, where the virtual machine is hosted by the edge computing device, and wherein the instructions further cause the processing circuitry to perform operations that: detect a deviation in at least one of the plurality of feature controls during the usage of the platform resources pre-allocated to the container.

In Example 28, the subject matter of Example 27 includes, where the instructions further cause the processing circuitry to perform operations that: determine a resource improvement rate based on the detected deviation.

In Example 29, the subject matter of Example 28 includes, where the instructions further cause the processing circuitry to perform operations that: adjust mapping of the defined usage of the accessible feature to the plurality of resource controls based on the resource improvement rate.

In Example 30, the subject matter of Examples 28-29 includes, where the instructions further cause the processing circuitry to perform operations that: adjust allocation of the platform resources to the container based on the resource improvement rate.

In Example 31, the subject matter of Examples 28-30 includes, where the computation model is a machine learning model, and wherein the instructions further cause the processing circuitry to perform operations that: adjust at least one weight of the machine learning model based on the resource improvement rate.

In Example 32, the subject matter of Examples 22-31 includes, where the SLA further defines usage of the accessible feature by a virtual service, and wherein the instructions further cause the processing circuitry to perform operations that: allocate a subset of the platform resources of the edge computing device to the container; and allocate at least a second subset of the platform resources of the edge computing device to an edge service instance instantiated as the virtual service on a second virtual machine in the edge computing system.

In Example 33, the subject matter of Example 32 includes, where the edge service instance includes a network function virtualization (NFV) instance instantiated as part of the virtual service.

In Example 34, the subject matter of Examples 32-33 includes, where the edge service instance is an edge service chain including multiple network function virtualization (NFV) instances instantiated as part of the virtual service.

In Example 35, the subject matter of Examples 32-34 includes, where the instructions further cause the processing circuitry to perform operations that: map the defined usage of the accessible feature by the virtual service to a second plurality of feature controls using the retrieved computation model, the second plurality of feature controls associated with the at least second subset of the platform resources of the edge computing device allocated to the edge service instance; and monitor usage of the at least second subset of the platform resources allocated to the edge service instance to detect a deviation from the second plurality of feature controls.

In Example 36, the subject matter of Examples 32-35 includes, where the second virtual machine used for instantiating the edge service instance is at the edge computing device, and wherein the instructions further cause the processing circuitry to perform operations that: instantiate a platform resource management service on the second virtual machine, the platform resource management service configured to manage allocations of the second subset of the platform resources among containers or virtual services executing on the second virtual machine.

In Example 37, the subject matter of Examples 22-36 includes, where the instructions further cause the processing circuitry to perform operations that: receive, from a platform software of the edge computing device, availability information for the platform resources of the edge computing device; and allocate the platform resources of the edge computing device to the application container based on the availability information.

In Example 38, the subject matter of Example 37 includes, where the instructions further cause the processing circuitry to perform operations that: receive a resource availability update via a sideband application programming interface (API) of the edge computing device, the resource availability update indicating addition or removal of dynamically off-loadable/on-loadable platform resources of the edge computing device.

In Example 39, the subject matter of Example 38 includes, where the instructions further cause the processing circuitry to perform operations that: re-map the defined usage of the accessible feature to a second plurality of resource controls using the retrieved computation model and further based on the resource availability update; and monitor usage of the platform resources allocated to the application container using the second plurality of resource controls.

In Example 40, the subject matter of Examples 22-39 includes, where the feature is a hardware resource or a service of the edge computing device, that is accessible by a client device according to characteristics of the feature.

In Example 41, the subject matter of Examples 22-40 includes, where the edge computing system is a Mobile Access Edge Computing (MEC) system operating according to a MEC specification, wherein the edge computing device is a MEC host, and wherein the feature is a MEC resource accessible within the MEC host.

Example 42 is a method performed by an edge computing device operable in an edge computing system, comprising: obtaining, from an orchestration provider, a SLO (or a SLA), the SLO (or SLA) defining usage of an accessible feature of the edge computing device by a container executing on a virtual machine within the edge computing system; retrieving a computation model based on at least one key performance indicator (KPI) specified in the SLA; mapping the defined usage of the accessible feature to a plurality of feature controls using the retrieved computation model, the plurality of feature controls associated with platform resources of the edge computing device pre-allocated to the container; and monitoring usage of the platform resources allocated to the container using the plurality of feature controls.

In Example 43, the subject matter of Example 42 includes, subject matter where the feature controls include low-level controls set on at least one of the platform resources.

In Example 44, the subject matter of Examples 42-43 includes, where the container is an application container associated with an application executing within the edge computing system.

In Example 45, the subject matter of Example 44 includes, where the application container is executing on the virtual machine to provide a service to a client of the edge computing system.

In Example 46, the subject matter of Examples 42-45 includes, where the SLO (or SLA) defines usage of the accessible feature of the edge computing device by the virtual machine or by a fixed-purpose image within the edge computing system.

In Example 47, the subject matter of Examples 42-46 includes, where the virtual machine is hosted by the edge computing device, and wherein the method further comprises: detecting a deviation in at least one of the plurality of feature controls during the usage of the platform resources pre-allocated to the container.

In Example 48, the subject matter of Example 47 includes, determining a resource improvement rate based on the detected deviation.

In Example 49, the subject matter of Example 48 includes, adjusting mapping of the defined usage of the accessible feature to the plurality of resource controls based on the resource improvement rate.

In Example 50, the subject matter of Examples 48-49 includes, adjusting allocation of the platform resources to the container based on the resource improvement rate.

In Example 51, the subject matter of Examples 48-50 includes, where the computation model is a machine learning model, and wherein the method further comprises: adjusting at least one weight of the machine learning model based on the resource improvement rate.

In Example 52, the subject matter of Examples 42-51 includes, where the SLO (or SLA) further defines usage of the accessible feature by a virtual service, and wherein the method further comprises: allocating a subset of the platform resources of the edge computing device to the container; and allocating at least a second subset of the platform resources of the edge computing device to an edge service instance instantiated as the virtual service on a second virtual machine in the edge computing system.

In Example 53, the subject matter of Example 52 includes, where the edge service instance includes a network function virtualization (NFV) instance instantiated as part of the virtual service.

In Example 54, the subject matter of Examples 52-53 includes, where the edge service instance is an edge service chain including multiple network function virtualization (NFV) instances instantiated as part of the virtual service.

In Example 55, the subject matter of Examples 52-54 includes, mapping the defined usage of the accessible feature by the virtual service to a second plurality of feature controls using the retrieved computation model, the second plurality of feature controls associated with the at least second subset of the platform resources of the edge computing device allocated to the edge service instance; and monitoring usage of the at least second subset of the platform resources allocated to the edge service instance to detect a deviation from the second plurality of feature controls.

In Example 56, the subject matter of Examples 52-55 includes, where the second virtual machine used for instantiating the edge service instance is at the edge computing device, and wherein the method further comprises: instantiating a platform resource management service on the second virtual machine, the platform resource management service configured to manage allocations of the second subset of the platform resources among containers or virtual services executing on the second virtual machine.

In Example 57, the subject matter of Examples 42-56 includes, receiving, from a platform software of the edge computing device, availability information for the platform resources of the edge computing device; and allocating the platform resources of the edge computing device to the application container based on the availability information.

In Example 58, the subject matter of Example 57 includes, receiving a resource availability update via a sideband application programming interface (API) of the edge computing device, the resource availability update indicating addition or removal of dynamically off-loadable/on-loadable platform resources of the edge computing device.

In Example 59, the subject matter of Example 58 includes, re-mapping the defined usage of the accessible feature to a second plurality of resource controls using the retrieved computation model and further based on the resource availability update; and monitoring usage of the platform resources allocated to the application container using the second plurality of resource controls.

In Example 60, the subject matter of Examples 42-59 includes, where the feature is a hardware resource or a service of the edge computing device, that is accessible by a client device according to characteristics of the feature.

In Example 61, the subject matter of Examples 42-60 includes, where the edge computing system is a Mobile Access Edge Computing (MEC) system operating according to a MEC specification, wherein the edge computing device is a MEC host, and wherein the feature is a MEC resource accessible within the MEC host.

Example 62 is at least one machine-readable medium including instructions that, when executed by processing circuitry, cause the processing circuitry to perform operations to implement of any of Examples 1-61.

Example 63 is an apparatus comprising means to implement of any of Examples 1-61.

Example 64 is a system to implement of any of Examples 1-61.

Example 65 is a method to implement of any of Examples 1-61.

Example 66 may include one or more computer-readable storage media comprising data to cause an electronic device, upon loading, execution, configuration, or provisioning of the data by one or more processors or electronic circuitry of the electronic device, to perform one or more elements of a method described in or related to any of Examples 1-61, or any other method or process described herein.

In the above Detailed Description, various features may be grouped together to streamline the disclosure. However, claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment.

What is claimed is:

1. An edge computing device in an edge computing system, comprising:
   processing circuitry; and
   a memory device comprising instructions stored thereon, wherein the instructions, when executed by the processing circuitry, configure the processing circuitry to perform operations to:
      obtain, from an orchestrator of the edge computing system, a plurality of desired application metrics for an application deployed in a container, the container executing on a virtual machine within the edge computing system and using hardware resources of the edge computing device, the hardware resources being pre-allocated to the container during a pre-allocation prior to deployment of the application in the container;
      retrieve a trained computation model from a plurality of trained computation models based on a desired application metric of the plurality of desired application metrics, and the trained computation model generated based on prior training by a deep learning training architecture to map between allocation of the hardware resources and a plurality of feature controls for the hardware resources that are applied to achieve the desired application metric;
      map the pre-allocation of the hardware resources of the edge computing device to the plurality of feature controls for the hardware resources of the edge computing device using the retrieved trained computation model;
      adjust mapping of the allocation of the hardware resources to the plurality of feature controls based on a resource usage improvement rate; and
      adjust the hardware resources that are pre-allocated to the container during the pre-allocation using the plurality of feature controls obtained by the mapping to achieve the desired application metric.

2. The edge computing device of claim 1, wherein the virtual machine is hosted by the edge computing device, and wherein the instructions further configure the processing circuitry to perform operations to:
   detect a deviation in at least one of the plurality of feature controls causes a deviation in the desired application metric, the deviation detected during usage of the hardware resources that are pre-allocated to the container.

3. The edge computing device of claim 2, wherein the instructions further configure the processing circuitry to perform operations to:
   determine the resource usage improvement rate based on the detected deviation, the resource usage improvement rate being a real number that quantifies a measure of the deviation in the at least one of the plurality of feature controls, the real number being greater than or equal to 0 and smaller than or equal to 1.

4. The edge computing device of claim 3, wherein the instructions further configure the processing circuitry to perform operations to:
adjust allocation of the hardware resources to the container based on the resource usage improvement rate.

5. The edge computing device of claim 3, wherein the trained computation model is a machine learning model, and wherein the instructions further configure the processing circuitry to perform operations to:
adjust at least one weight of the machine learning model for mapping of the allocation, based on the resource usage improvement rate, the at least one weight comprising a parameter used by the machine learning model.

6. The edge computing device of claim 1, wherein the plurality of desired application metrics further defines allocation of the hardware resources by a virtual service, and the instructions further configure the processing circuitry to perform operations to:
allocate a subset of the hardware resources of the edge computing device to the container; and
allocate at least a second subset of the hardware resources of the edge computing device to an edge service instance instantiated as the virtual service on a second virtual machine in the edge computing system.

7. The edge computing device of claim 6, wherein the edge service instance includes a network function virtualization (NFV) instance instantiated as part of the virtual service.

8. The edge computing device of claim 6, wherein the edge service instance is an edge service chain including multiple network function virtualization (NFV) instances instantiated as part of the virtual service.

9. The edge computing device of claim 6, wherein the instructions further configure the processing circuitry to perform operations to:
map the allocation of the hardware resources by the virtual service to a second plurality of feature controls using the retrieved trained computation model, the second plurality of feature controls associated with the at least a second subset of the hardware resources of the edge computing device allocated to the edge service instance; and
monitor usage of the at least a second subset of the hardware resources allocated to the edge service instance to detect a deviation from the second plurality of feature controls.

10. The edge computing device of claim 6, wherein the second virtual machine used for instantiating the edge service instance is at the edge computing device, and wherein the instructions further configure the processing circuitry to perform operations to:
instantiate a platform resource management service on the second virtual machine, the platform resource management service configured to manage allocations of the second subset of the hardware resources among one of containers executing on the second virtual machine or virtual services executing on the second virtual machine.

11. The edge computing device of claim 1, wherein the instructions further configure the processing circuitry to perform operations to:
receive, from a platform software of the edge computing device, availability information for the hardware resources of the edge computing device; and
allocate the hardware resources of the edge computing device to the container based on the availability information.

12. The edge computing device of claim 11, wherein the instructions further configure the processing circuitry to perform operations to:
receive a resource availability update via a sideband application programming interface (API) of the edge computing device, the resource availability update indicating addition or removal of dynamically off-loadable/on-loadable hardware resources of the edge computing device.

13. The edge computing device of claim 12, wherein the instructions further configure the processing circuitry to perform operations to:
re-map the allocation of the hardware resources to a second plurality of resource controls using the retrieved trained computation model and further based on the resource availability update; and
monitor the usage of the hardware resources allocated to the container using the second plurality of resource controls.

14. The edge computing device of claim 1, wherein the hardware resources of the edge computing device are accessible by a at least a second application deployed in the edge computing system.

15. The edge computing device of claim 1, wherein the edge computing system is a Mobile Access Edge Computing (MEC) system operating according to a MEC specification, wherein the edge computing device is an MEC host, and wherein the hardware resources include a MEC resource accessible within the MEC host.

16. The edge computing device of claim 1, further comprising:
a storage device, wherein the plurality of desired application metrics is stored locally at the edge computing device using the storage device.

17. The edge computing device of claim 1, wherein the orchestrator is a device that is separate from the edge computing device.

18. The edge computing device of claim 1, wherein the desired application metric is at least one of:
desired latency;
desired response time; and
desired throughput.

19. At least one non-transitory machine-readable storage medium comprising instructions, wherein the instructions, when executed by processing circuitry of an edge computing device operable in an edge computing system, cause the processing circuitry to perform operations that:
obtain, from an orchestrator of the edge computing system, a plurality of desired application metrics for an application deployed in a container, the container executing on a virtual machine within the edge computing system and using hardware resources of the edge computing device, the hardware resources being pre-allocated to the container during a pre-allocation prior to deployment of the application in the container;
retrieve a computation model from a plurality of computation models based on a desired application metric of the plurality of desired application metrics, and the computation model generated based on prior training by a deep learning training architecture to map between allocation of the hardware resources and a plurality of feature controls for the hardware resources that are applied to achieve the desired application metric;

map the pre-allocation of the hardware resources of the edge computing device to the plurality of feature controls for the hardware resources of the edge computing device using the retrieved computation model;

adjust mapping of the allocation of the hardware resources to the plurality of feature controls based on a resource usage improvement rate; and adjust the hardware resources that are pre-allocated to the container during the pre-allocation using the plurality of feature controls obtained by the mapping to achieve the desired application metric.

20. The machine-readable storage medium of claim 19, wherein the virtual machine is hosted by the edge computing device, and wherein the instructions further cause the processing circuitry to perform operations that:

detect a deviation in at least one of the plurality of feature controls causes a deviation in the desired application metric, the deviation detected during usage of the hardware resources that are pre-allocated to the container.

21. The machine-readable storage medium of claim 20, wherein the instructions further cause the processing circuitry to perform operations that:

determine the resource usage improvement rate based on the detected deviation, the resource usage improvement rate being a real number that quantifies a measure of the deviation in the at least one of the plurality of feature controls, the real number being greater than or equal to 0 and smaller than or equal to 1.

22. A method performed by an edge computing device operable in an edge computing system, comprising:

obtaining, from an orchestrator of the edge computing system, a plurality of desired application metrics for an application deployed in a container, the container executing on a virtual machine within the edge computing system and using hardware resources of the edge computing device, the hardware resources being pre-allocated to the container during a pre-allocation prior to deployment of the application in the container;

retrieving a computation model from a plurality of computation models based on a desired application metric of the plurality of desired application metrics, and the computation model generated based on prior training by a deep learning training architecture to map between allocation of the hardware resources and a plurality of feature controls for the hardware resources that are applied to achieve the desired application metric;

mapping the pre-allocation of the hardware resources of the edge computing device to the plurality of feature controls for the hardware resources of the edge computing device using the retrieved computation model;

adjusting the mapping based on a resource usage improvement rate; and adjusting the hardware resources that are pre-allocated to the container during the pre-allocation using the plurality of feature controls obtained by the mapping to achieve the desired application metric.

23. The method of claim 22, wherein the virtual machine is hosted by the edge computing device, and wherein the method further comprises:

detecting a deviation in at least one of the plurality of feature controls causes a deviation in the desired application metric, the deviation detected during usage of the hardware resources that are pre-allocated to the container; and determining the resource usage improvement rate based on the detected deviation, the resource usage improvement rate being an integer that quantifies a measure of the deviation in the at least one of the plurality of feature controls, the integer being greater than or equal to 0 and smaller than or equal to 1.

24. The method of claim 22, wherein the plurality of desired application metrics further defines allocation of the hardware resources by a virtual service, and wherein the method further comprises:

allocating a subset of the hardware resources of the edge computing device to the container; and allocating at least a second subset of the hardware resources of the edge computing device to an edge service instance instantiated as the virtual service on a second virtual machine in the edge computing system.

25. The method of claim 24, further comprising:

mapping the defined allocation of the hardware resources by the virtual service to a second plurality of feature controls using the retrieved computation model, the second plurality of feature controls associated with the at least a second subset of the hardware resources of the edge computing device allocated to the edge service instance; and monitoring usage of the at least a second subset of the hardware resources allocated to the edge service instance to detect a deviation from the second plurality of feature controls.

\* \* \* \* \*